US012675897B2

(12) United States Patent
Odamaki et al.

(10) Patent No.: US 12,675,897 B2
(45) Date of Patent: Jul. 7, 2026

(54) IMAGE PROCESSING METHOD, RECORDING MEDIUM, IMAGE PROCESSING APPARATUS, AND IMAGE PROCESSING SYSTEM

(71) Applicants: Makoto Odamaki, Kanagawa (JP);
Hirochika Fujiki, Kanagawa (JP)

(72) Inventors: Makoto Odamaki, Kanagawa (JP);
Hirochika Fujiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 308 days.

(21) Appl. No.: 18/275,416

(22) PCT Filed: Jan. 25, 2022

(86) PCT No.: PCT/IB2022/050616
§ 371 (c)(1),
(2) Date: Aug. 2, 2023

(87) PCT Pub. No.: WO2022/180459
PCT Pub. Date: Sep. 1, 2022

(65) Prior Publication Data
US 2024/0087157 A1 Mar. 14, 2024

(30) Foreign Application Priority Data

Feb. 25, 2021 (JP) ................................. 2021-029207

(51) Int. Cl.
*G06T 7/70* (2017.01)
*G06T 7/579* (2017.01)
*H04N 23/667* (2023.01)
(52) U.S. Cl.
CPC ................ *G06T 7/70* (2017.01); *G06T 7/579* (2017.01); *G06T 2207/10016* (2013.01); *H04N 23/667* (2023.01)

(58) Field of Classification Search
CPC . G06T 7/70; G06T 7/579; G06T 2207/10016; H04N 23/667
See application file for complete search history.

(56) References Cited

U.S. PATENT DOCUMENTS 10,708,505 B2 * 7/2020 Taya .................... H04N 23/633
2006/0028675 A1 2/2006 Watanabe et al.
(Continued)

FOREIGN PATENT DOCUMENTS

EP 3629570 A2 * 4/2020 ............... H04N 5/77
JP 2002-165094 6/2002
(Continued)

OTHER PUBLICATIONS

International Search Report and Written Opinion issued on Apr. 21, 2022 in PCT/IB2022/050616 filed on Jan. 25, 2022, 9 pages.

*Primary Examiner* — Delomia L Gilliard
(74) *Attorney, Agent, or Firm* — XSENSUS LLP

(57) ABSTRACT

An image processing method performed by an image processing apparatus includes acquiring multiple still images of omnidirectional views captured at different image-capturing positions in a site by an image-capturing apparatus; acquiring a moving image captured by the image-capturing apparatus during movement of the image-capturing apparatus from a first location to a second location in the site; estimating the image-capturing positions of the multiple still images based on the acquired moving image; and generating a processed image including the multiple still images associated with each other based on the estimated image-capturing positions.

13 Claims, 29 Drawing Sheets

(56)                     References Cited

U.S. PATENT DOCUMENTS

| | | | |
|---|---|---|---|
| 2008/0159650 A1 | 7/2008 | Odamaki | |
| 2011/0222121 A1 | 9/2011 | Odamaki | |
| 2019/0020816 A1 | 1/2019 | Shan et al. | |
| 2019/0020817 A1 | 1/2019 | Shan et al. | |
| 2019/0026958 A1* | 1/2019 | Gausebeck | ............. G06T 7/579 |
| 2019/0289206 A1* | 9/2019 | Kawaguchi | ............ H04N 23/45 |
| 2020/0236277 A1 | 7/2020 | Odamaki et al. | |
| 2021/0065331 A1 | 3/2021 | Fujiki | |
| 2021/0090210 A1 | 3/2021 | Suitoh et al. | |

FOREIGN PATENT DOCUMENTS

| | | |
|---|---|---|
| JP | 2002-335401 | 11/2002 |
| JP | 2003-283829 | 10/2003 |
| JP | 2004-088286 | 3/2004 |
| JP | 2008-165381 | 7/2008 |
| JP | 2010-219966 | 9/2010 |
| JP | 2011-191903 | 9/2011 |
| JP | 2016-194784 | 11/2016 |
| JP | 2018-081548 | 5/2018 |
| JP | 2019-075766 | 5/2019 |
| JP | 2021-034897 | 3/2021 |
| JP | 2021-047796 | 3/2021 |
| JP | 2022-077148 | 5/2022 |
| WO | WO2019/088273 A1 | 5/2019 |

* cited by examiner

FIG. 1

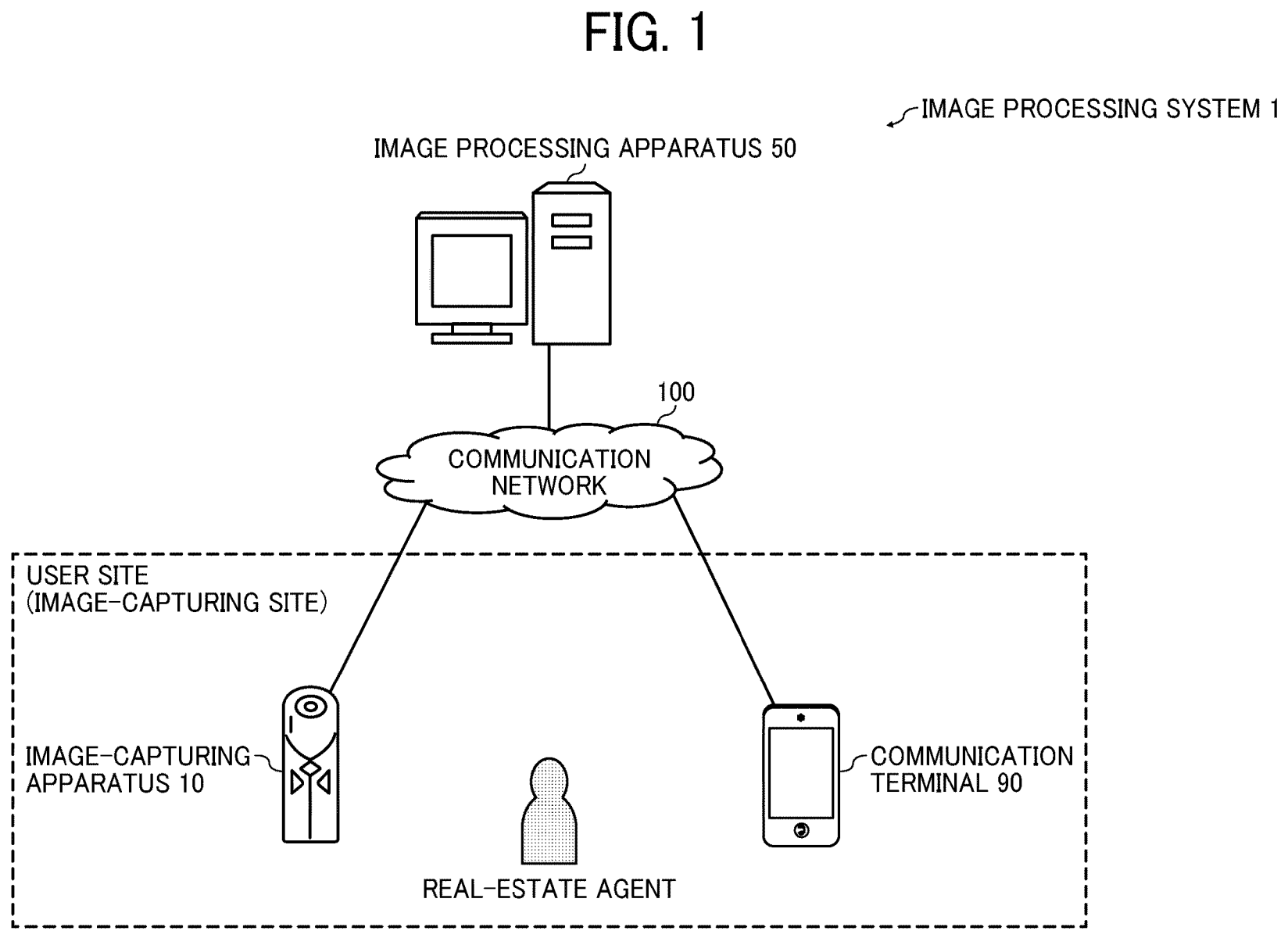

IMAGE PROCESSING SYSTEM 1

IMAGE PROCESSING APPARATUS 50

100

COMMUNICATION NETWORK

COMMUNICATION TERMINAL 90

REAL-ESTATE AGENT

USER SITE (IMAGE-CAPTURING SITE)

IMAGE-CAPTURING APPARATUS 10

EQUIRECTANGULAR PROJECTION IMAGE EC

SPHERICAL IMAGE CE

FIG. 7

SPHERICAL IMAGE CE
(SPHERE CS)

PRESCRIBED REGIONAL IMAGE Q
(PRESCRIBED REGION T)

10

20

θ

C h d

A

B

SPECIAL IMAGE-CAPTURING APPARATUS
(OMNI-DIRECTIONAL IMAGE CAPTURING)

COMPARATIVE EXAMPLE

TYPICAL IMAGE-CAPTURING APPARATUS
(ROTATIONAL IMAGE CAPTURING)

COMPARATIVE EXAMPLE

AREA WHOSE IMAGE CANNOT BE CAPTURED BY TYPICAL IMAGE-CAPTURING APPARATUS

AREA WHOSE IMAGE CANNTO BE CAPTURED BY TYPICAL IMAGE-CAPTURING APPARATUS

STITCHING ERRORS

TOUR PATHS

ENTRANCE

WESTERN-STYLE ROOM

CLOSET

LDK

WESTERN-STYLE ROOM

CLOSET

CLOSET

JAPANESE-STYLE ROOM

BALCONY

POSITION ESTIMATION RESULTS

IMAGE-CAPTURING POSITION

IMAGE PROCESSING APPARATUS 50 (COMMUNICATION TERMINAL 90)

| IMAGE-CAPTURING PURPOSE | MOVING-IMAGE CAPTURING MODE | STILL-IMAGE CAPTURING MODE |
|---|---|---|
| IMAGE-CAPTURING MODE | FOR POSITIONAL ESTIMATION | FOR BROWSING |
| SUCCESSIVE FRAME | IN MOTION | DURING REST |
| RESOLUTION | NECESSARY | UNNECESSARY |
| COLOR | LOW | HIGH |
| DYNAMIC RANGE | GRAY SCALE | RGB |
| | LOW | HIGH |

IMAGE PROCESSING METHOD, RECORDING MEDIUM, IMAGE PROCESSING APPARATUS, AND IMAGE PROCESSING SYSTEM

CROSS-REFERENCE TO RELATED APPLICATIONS

The present application is based on PCT/IB2022/050616 filed on Jan. 25, 2022, which claims priority to Japanese Patent Application No. 2021-029207, filed Feb. 25, 2021, the entire contents of each are incorporated herein by reference.

TECHNICAL FIELD

The present disclosure relates to an image processing method, a recording medium, an image processing apparatus, and an image processing system.

BACKGROUND ART

A system is known that distributes image data captured by using an image capturing apparatus capable of capturing images in all directions and allows browsing of a situation of a remote site at another site. A full spherical image obtained by capturing an image of all directions at a certain site allows a viewer to view an image in any direction desired by the viewer and obtain realistic information. Such systems are used, for example, in the field of on-line viewing of properties in the real estate industry.

Further, a virtual tour service exists that allows a viewer to experience as if the viewer were really browsing inside a real-estate property by using images captured at multiple photographing sites of the property and connected to each other. In order to create such a virtual tour, images captured at multiple photographing sites are to have their proper portions connected to each other. Technologies (for example, U.S. Pat. Nos. 10,375,306 and 10,530,997) are known that estimates locations at which the captured images have been photographed, using acceleration information measured by an inertial measurement unit (IMU), to create such virtual tours.

CITATION LIST

Patent Literature

[PTL 1] U.S. Pat. No. 10,375,306
[PTL 2] U.S. Pat. No. 10,530,997

SUMMARY OF INVENTION

Technical Problem

However, such a method involving performing position estimation by using acceleration information measured by an IMU faces difficulties in the accuracy of the position estimation on the captured images to create virtual tours.

Solution to Problem

In view of the above, there is provided an image processing method performed by an image processing apparatus includes acquiring multiple still images of omnidirectional views captured at different image-capturing positions in a site by an image-capturing apparatus; acquiring a moving image captured by the image-capturing apparatus during movement of the image-capturing apparatus from a first location to a second location in the site; estimating the image-capturing positions of the multiple still images based on the acquired moving image; and generating a processed image including the multiple still images associated with each other based on the estimated image-capturing positions. [Advantageous Effects of Invention] Embodiments of the present disclosure achieves a higher accuracy of estimation of positions at which images have been captured to provide a virtual tour.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 1 is an illustration of a configuration of an image processing system according to an embodiment.

FIG. 4A is a conceptual diagram of an example of how the equirectangular projection image is mapped to a surface of a sphere.

FIG. 4B is an illustration of a spherical image.

FIG. 7 is an illustration of the image-capturing apparatus capturing an image, according to an embodiment.

FIG. 21A and FIG. 21B are illustrations of tour paths in a virtual tour, according to embodiments of the present disclosure.

DESCRIPTION OF EMBODIMENTS

Figure 2:
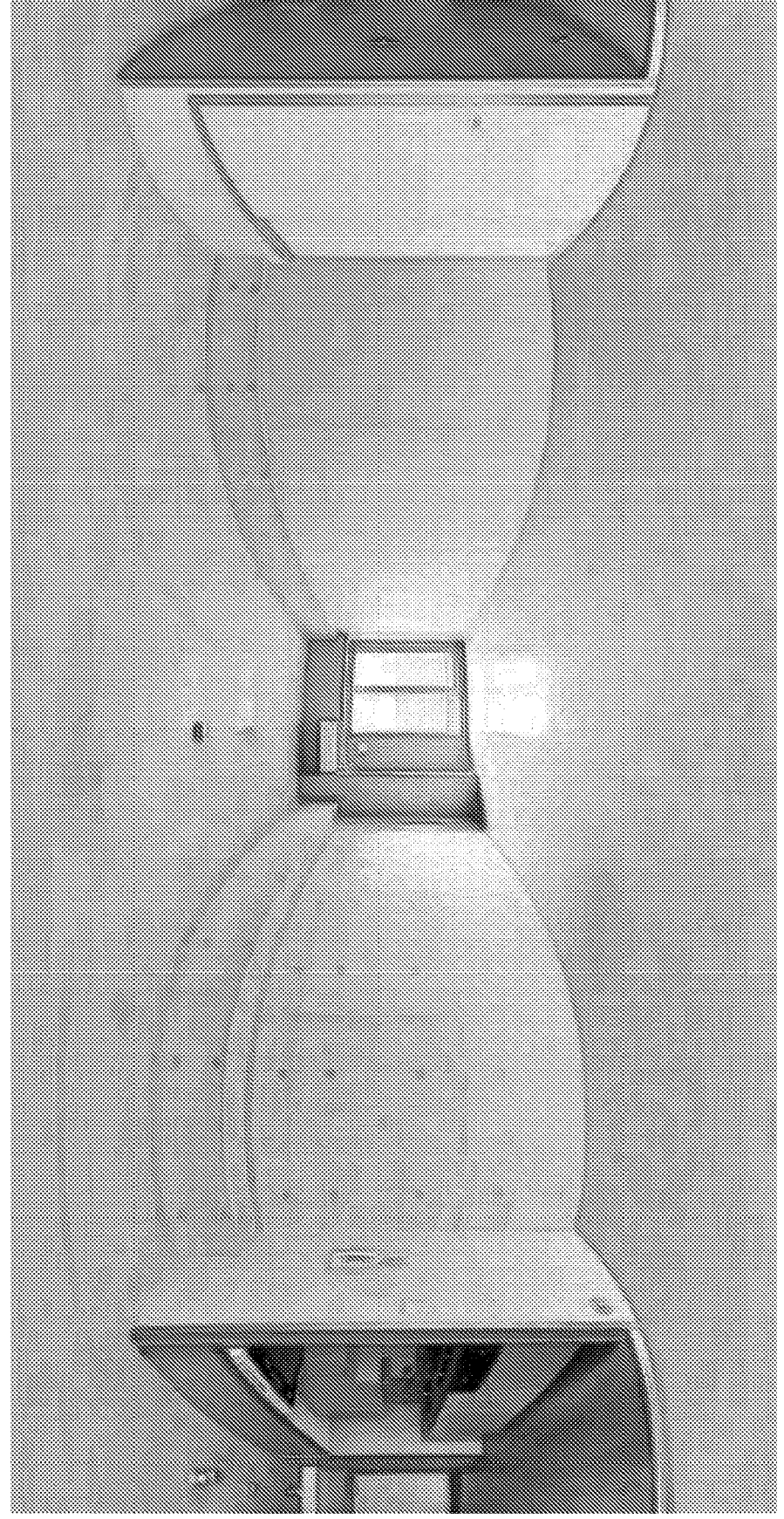
FIG. 2 is an illustration of a spherical image captured by an image-capturing apparatus in FIG. 1 according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail referring to the drawings. Like reference signs are applied to identical or corresponding components throughout the drawings and redundant description thereof may be omitted.

First, referring to FIG. 1, an overview of an image processing system is described according to an embodiment. FIG. 1 is an illustration of a configuration of an image processing system 1 according to an embodiment. The image processing system 1 in FIG. 1 processes captured images to allow a viewer to browse online a space inside a structure such as a real estate property.

As illustrated in FIG. 1, the image processing system 1 includes an image-capturing apparatus 10, an image processing apparatus 50, and a communication terminal 90. In the image processing system 1, the image-capturing apparatus 10, the image processing apparatus 50, and the communication terminal 90 are each communicable with one another via a communication network 100. The communication network 100 is implemented by the Internet, mobile communication network, local area network (LAN), etc. The communication network 100 may include, in addition to a wired network, a wireless network in compliance with such as 3rd Generation (3G), 4th Generation (4G), 5th Generation (5G), Wireless Fidelity (Wi-Fi; Registered Trademark), Worldwide Interoperability for Microwave Access (WiMAX), Long Term Evolution (LTE), etc.

The image processing apparatus 50 is a server computer that processes captured images of space inside a structure such as a real estate property. For example, the image processing apparatus 50 acquires a captured image captured by the image-capturing apparatus 10 and generates a tour image used to provide a virtual tour to a user by using the acquired captured image. The "virtual tour" is content that allows a user to view online the inside of a structure such as a real-estate property while experiencing as if the user were actually viewing the structure on-site. In addition, the tour image is an image generated from multiple images captured by the image-capturing apparatus 10, which is to be viewed by the user while allowing the user to virtually move within a site at which the images have been captured by the image-capturing apparatus 10, according to the user's operation.

The image processing apparatus 50 may be implemented by a single server computer or may be implemented by multiple server computers. The description is given of an example in which the image processing apparatus 50 is a server computer that resides in a cloud environment. In another example, the image processing apparatus 50 is a server that resides in an on-premises environment.

The image-capturing apparatus 10 is a special digital camera, or a spherical-image capturing apparatus that captures a spherical (360 degrees) image of a space inside a structure such as a real-estate property. The image-capturing apparatus 10 is used by, for example, a real estate agent that manages or sells real estate properties.

Notably, other examples of the image-capturing apparatus 10 include a wide-angle camera and a stereo camera, which both captures a wide-angle-view image with an angle of view of a specified value or greater. Further, the wide-angle-view image is typically an image taken with a wide-angle lens, such as a lens capable of taking a range wider than a range that the human eye can perceive. In other words, the special image-capturing apparatus 10 is image capturing means configured to acquire an image, such as a spherical image and a wide-angle-view image, captured with a lens having a focal length shorter than a prescribed value. Further, the wide-angle-view image is typically an image taken with a lens having a focal length of 35 mm or less in terms of 35 mm film.

The communication terminal 90 is a computer such as a smartphone that displays an image processed by the image processing apparatus 50 and allows a viewer to view the image. The communication terminal 90 is used by, for example, the same real estate agent as that using the image-capturing apparatus 10. In the communication terminal 90, for example, a dedicated application is installed that issues image-capturing instructions to the image-capturing apparatus 10 and allows browsing of an image output from the image processing apparatus 50 is installed. In some examples, the communication terminal 90 may be configured to request access to a dedicated Web site via Web browser to issue image-capturing instructions to the image-capturing apparatus 10 and allow browsing of an image. Alternatively, another communication terminal 90 may issue image-capturing instructions to the image-capturing apparatus 10 and allow browsing of an image.

Examples of the communication terminal 90 are not limited to a mobile phone such as a smartphone, but include a PC, a tablet terminal, a wearable terminal, a head mount display, and an Interactive White Board (IWB: electronic whiteboard with mutual communication capability).

Referring to FIGS. 2 to 11, an overview of the image-capturing apparatus 10 constituting the image processing system 1 is described according to an embodiment. FIG. 2 is an illustration of a spherical image captured by the image-capturing apparatus 10 in FIG. 1 according to an embodiment of the present disclosure. An image in FIG. 2 is a spherical image that represents a room of a real-estate property, which is an example of space inside a structure, captured by the image-capturing apparatus 10. The spherical image, in which an omnidirectional view of the inside of the room is captured, is suitable for browsing real-estate properties. Although there are various forms of the spherical image, the spherical image is often generated by the equirectangular cylindrical projection to be described later. The image generated by the equidistant cylindrical projection has advantages in that the outer shape of the image is rectangular and image data can be efficiently and easily stored, and that the image looks relatively natural because distortion in the vicinity of the equator is small and vertical straight lines are not distorted.

Referring to FIGS. 3 to 9, operation of generating a spherical image is described according to exemplary embodiments. Next, referring to FIGS. 3A to 3C and FIGS. 4A and 4B, a description is given of an overview of an operation of generating an equirectangular projection image and a spherical image from the images captured by the image-capturing apparatus 10. FIG. 3A is a front view of a hemispherical image captured by the image-capturing apparatus in FIG. 1. FIG. 3B is a rear view of a hemispherical image captured by the image-capturing apparatus in FIG. 1. FIG. 3C is an illustration of an image represented by equidistant projection (hereinafter, may be referred to as an equirectangular projection image). FIG. 4A is a conceptual diagram of an example of how the equirectangular projection image is mapped to a surface of a sphere. FIG. 4B is an illustration of the spherical image.

The image-capturing apparatus 10 includes images sensors at the front side and the rear side. These image sensors are used in combination with optical members, each being configured to capture a hemispherical image having an angle of view of 180 degrees or wider. The two image sensors of the image-capturing apparatus 10 capture the images of the objects surrounding the user to obtain two hemispherical images.

Figures 3A, 3B:
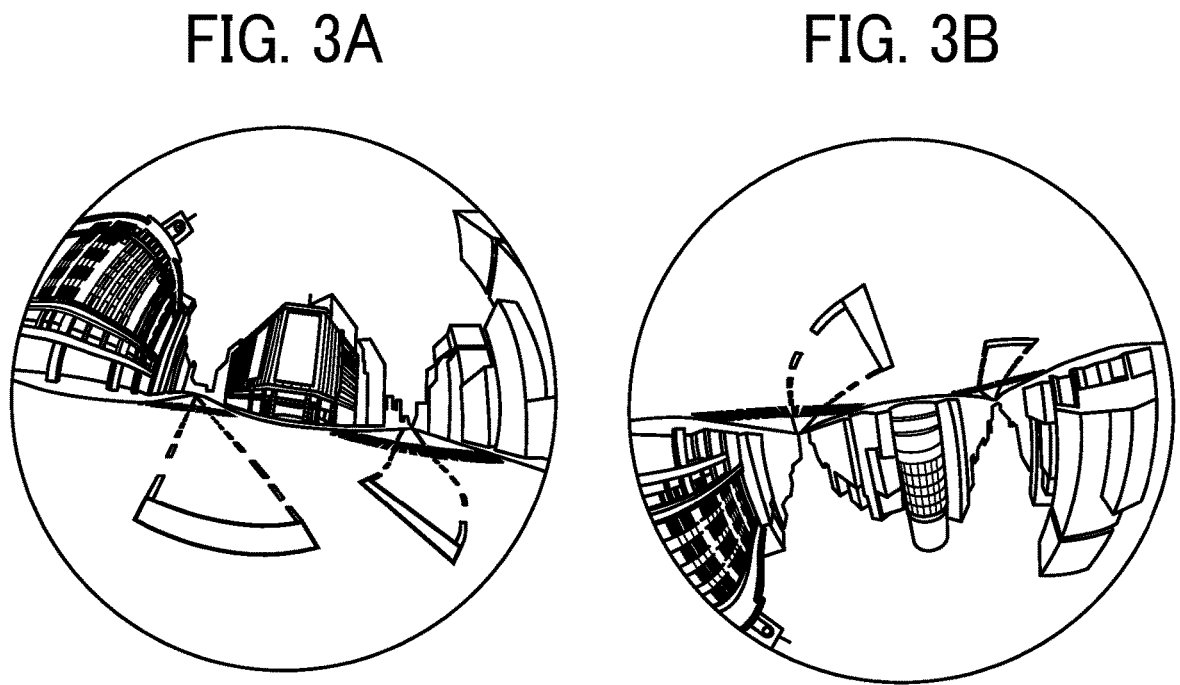
FIG. 3A is a front view of a hemispherical image captured by the image-capturing apparatus in FIG. 1.
FIG. 3B is a rear view of a hemispherical image captured by the image-capturing apparatus in FIG. 1.
Figure 3C:
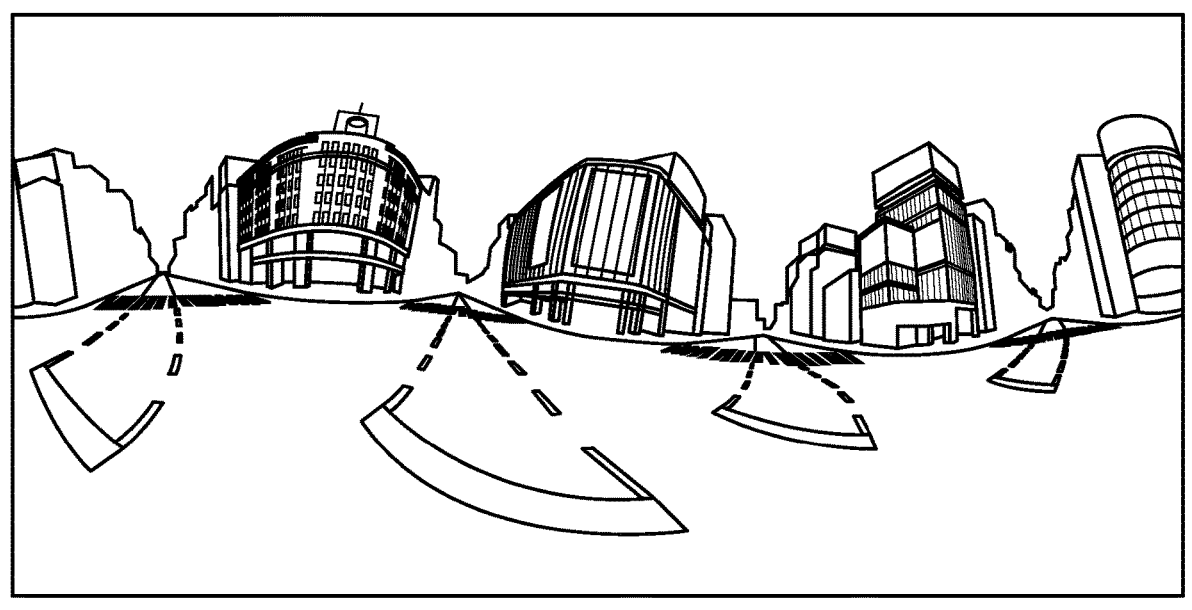
FIG. 3C is an illustration of an image represented by equidistant cylindrical projection.
Figures 4A, 4B:
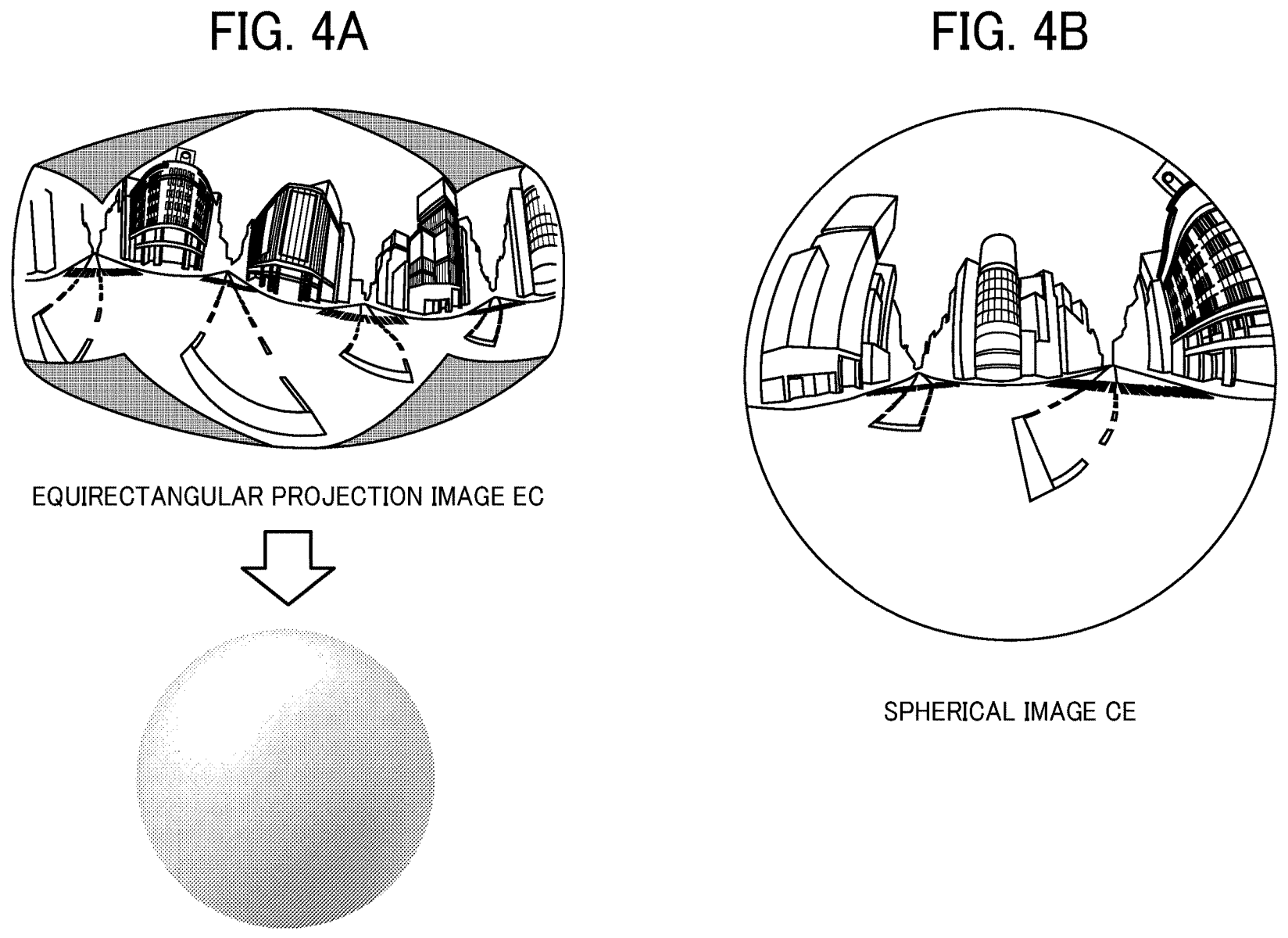

As illustrated in FIGS. 3A and 3B, images captured by the image sensors of the image-capturing apparatus 10 are curved hemispherical images (front side and rear side), respectively. The image-capturing apparatus 10 combines the hemispherical image (front side) and the hemispherical image (back side), which are reversed by 180-degree from each other, to generate the equirectangular projection image EC as illustrated in FIG. 3C. The image-capturing apparatus 10 uses Open Graphics Library for Embedded Systems (OpenGL ES) to map the equirectangular projection image EC so as to cover the sphere surface as illustrated in FIG. 4A, to generate the spherical image CE (spherical panoramic image) as illustrated in FIG. 4B. In other words, the spherical image CE is represented as the equirectangular projection image EC, which corresponds to a surface facing the center of the sphere. It should be noted that OpenGL ES is a graphic library used for visualizing two-dimensional (2D) and three-dimensional (3D) data. The spherical image CE is either a still image or a moving image. Furthermore, the transformation method is not limited to OpenGL ES, and may be any method capable of transforming a hemispherical image into an equirectangular projection image. For example, the transformation method may be an operation by a CPU or an operation by OpenCL.

Since the spherical image CE is an image attached to the sphere surface to cover the sphere surface, as illustrated in FIG. 4B, a part of the image may look distorted when viewed from the user, providing a feeling of strangeness. To avoid such strangeness, the image-capturing apparatus 10 displays an image of a predetermined area T, which is a part of the spherical image CE, as a flat image having fewer curves. The predetermined area is, for example, a part of the spherical image CE that is viewable by the user. In this disclosure, the image of the predetermined area, which is viewable, may be referred to as a "predetermined-area image" or "viewable-area image" Q. That is, the term "predetermined-area image" and "viewable-area image" may be used interchangeably. A description is now given of displaying the viewable-area image, with reference to FIG. 5 and FIG. 6.

Figure 5:
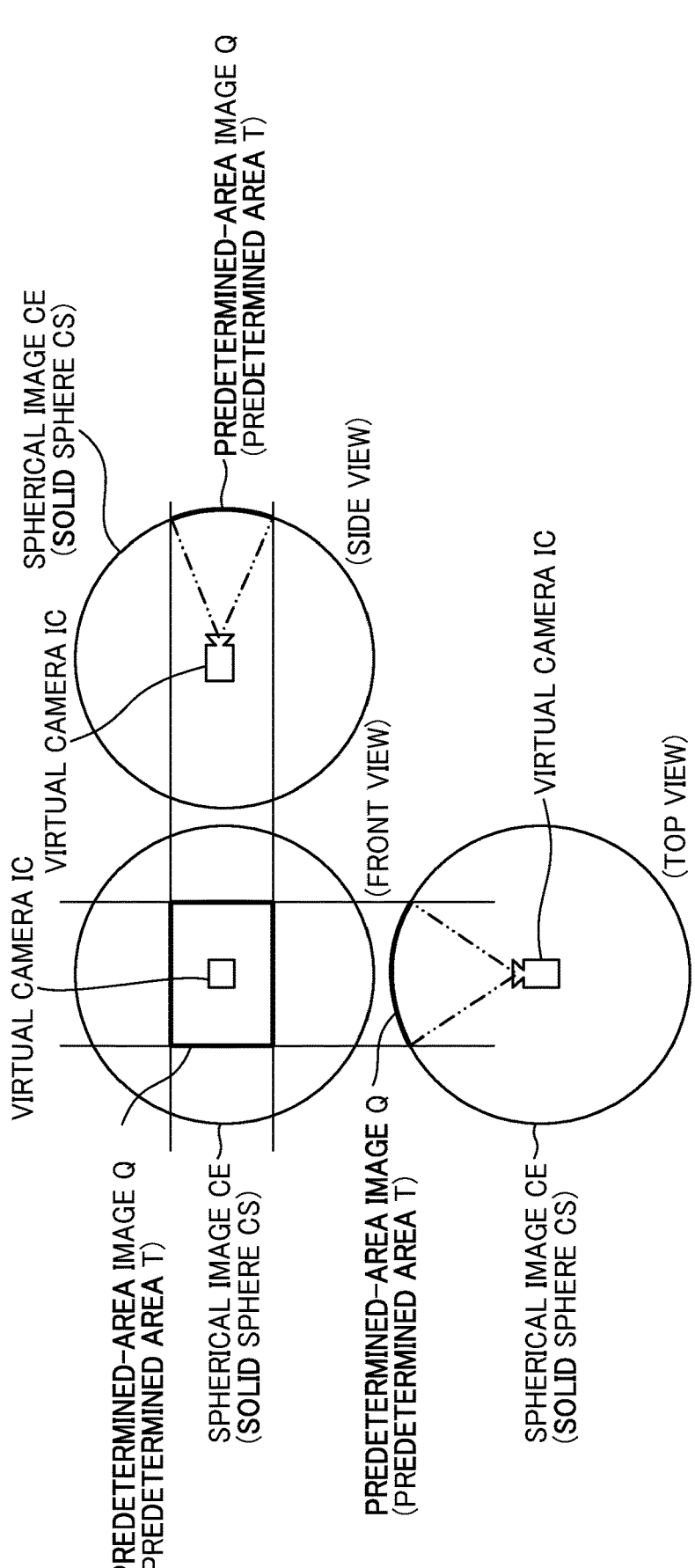
FIG. 5 is an illustration of relative positions of a virtual camera and a viewable area when spherical image is represented as a surface area of a three-dimensional solid sphere.

FIG. 5 is an illustration of relative positions of a virtual camera IC and a viewable area when the spherical image CE is represented as a surface area of a three-dimensional solid sphere CS. The virtual camera IC corresponds to a position of a point of view (viewpoint) of a user who is viewing the spherical image CE represented as a surface area of the three-dimensional solid sphere CS. The spherical image CE in FIG. 5 is represented as a surface area of the three-dimensional (3D) solid sphere CS. Assuming that the spherical image CE having been generated is a surface area of the solid sphere CS, the virtual camera IC is inside of the spherical image CE as illustrated in FIG. 5. The predetermined area T in the spherical image CE is an image-capturing area of the virtual camera IC. Specifically, the predetermined area T is identified by predetermined-area information indicating an image-capturing direction and an angle of view of the virtual camera IC in a three-dimensional virtual space containing the spherical image CE. In addition, zooming in the viewable area T is also determined by bringing the virtual camera IC closer to or away from the spherical image CE. The predetermined-area image (viewable-area image) Q is an image of the predetermined area T, in the spherical image CE. The predetermined area T is defined by the angle of view a and a distance f between the virtual camera IC and the spherical image CE.

The predetermined-area image Q, which is an image of the predetermined area T, is displayed on a display as an image of an image-capturing area of the virtual camera IC. The following describes the position of the virtual camera IC, using an image-capturing direction (ea, aa) and an angle of view a of the virtual camera IC. In another example, the predetermined area T is identified by an image-capturing area (X, Y, Z) of the virtual camera IC (see FIG. 6), i.e., the predetermined area T, rather than the angle of view a and the distance f.

Figure 6:
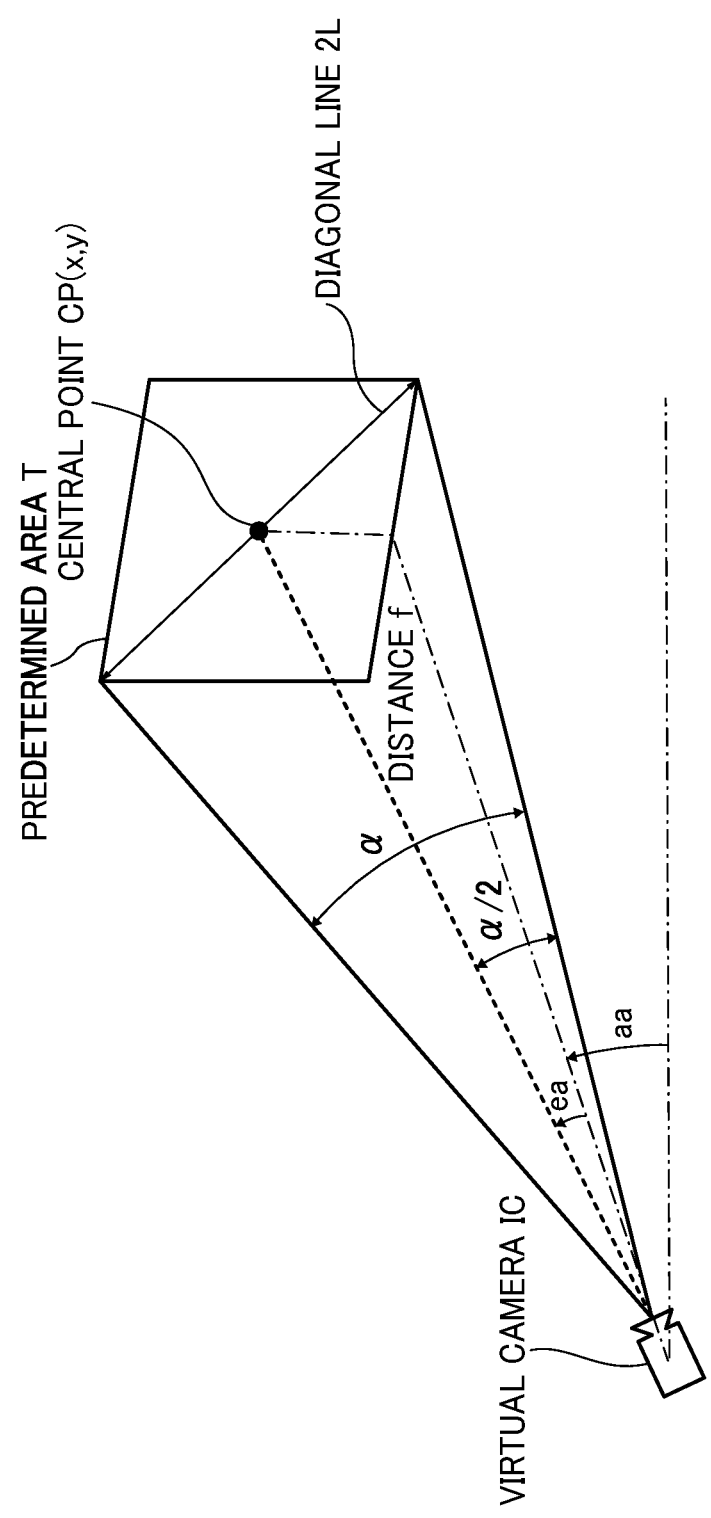
FIG. 6 is an illustration of a relation between predetermined-area information (viewable-area information) and a predetermined-area image (viewable-area image) according to an embodiment.

Referring to FIG. 6, the relation between the predetermined-area information and the image of the predetermined area T is described according to an embodiment. FIG. 6 is an illustration the relation between the predetermined-area information and the image of the predetermined area T. As illustrated in FIG. 6, "ea" denotes an elevation angle, "aa" denotes an azimuth angle, and "a" denotes an angle of view, respectively, of the virtual camera IC. The position of the virtual camera IC is adjusted, such that the point of gaze of the virtual camera IC, indicated by the image-capturing direction (ea, aa), matches the center point CP (x, y) of the predetermined area T as the image-capturing area of the virtual camera IC. As illustrated in FIG. 6, when it is assumed that a diagonal angle of the predetermined area T defined by the angle of view a of the virtual camera IC is a, the center point CP (x, y) provides the parameters (x, y) of the predetermined-area information. The predetermined-area image (viewable-area image) Q is an image of the predetermined area T, in the spherical image CE. The sign "f" denotes a distance between the virtual camera IC and the central point CP (x, y) of the predetermined area T. The sign "L" is a distance between the center point CP (x, y) and a given vertex of the predetermined area T (2L is a diagonal line). In FIG. 6, a trigonometric function equation typically given by the following Equation (1) is satisfied:

$$L/f=\tan(n/2) \tag{1}$$

Figure 7:
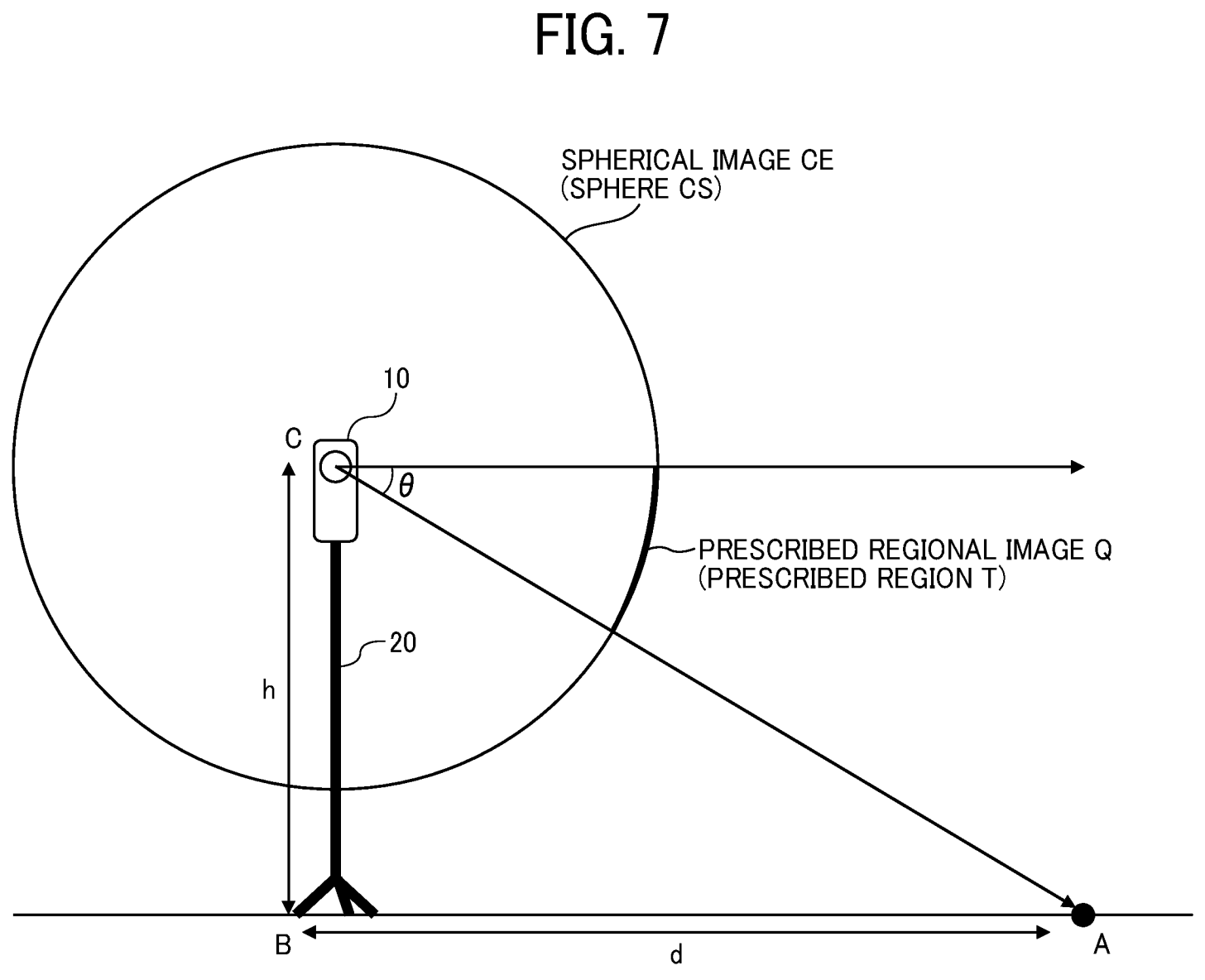

Next, how the image-capturing apparatus 10 captures an image is described with reference to FIG. 7. FIG. 7 is an illustration of the image-capturing apparatus 10 capturing an image, according to an embodiment. To capture an image that allows the viewer to view the entire room of a real estate property, the image-capturing apparatus 10 is to be located at a height close to the human-eye. To enable such an arrangement, the image-capturing apparatus 10 is fixed onto a support 20 such as a monopod or a tripod, to capture an image. As described above, the image-capturing apparatus 10 captures rays in all the directions around the image-capturing apparatus 10, which means that the image-capturing apparatus 10 captures an image (a spherical image CE) on a unit sphere around the image-capturing apparatus 10. The image-capturing apparatus 10 determines the coordinates of a spherical image, which are based on the image-capturing direction. In FIG. 7, for example, a point A is located at a distance of (d, —h) from the center point C of the image-capturing apparatus 10, and an angle θ between the line segment AC and the horizontal direction is given by Equation (2) below:

$$\theta=\arctan(h/d) \tag{2}$$

Assuming that the angle θ between the horizontal direction and the line segment AC is a depression angle, a distance d between the point A and the point B is given by Equation (3) below where h is the height of the image-capturing apparatus 10:

$$d=h/\tan\theta \tag{3}$$

Figure 8A:
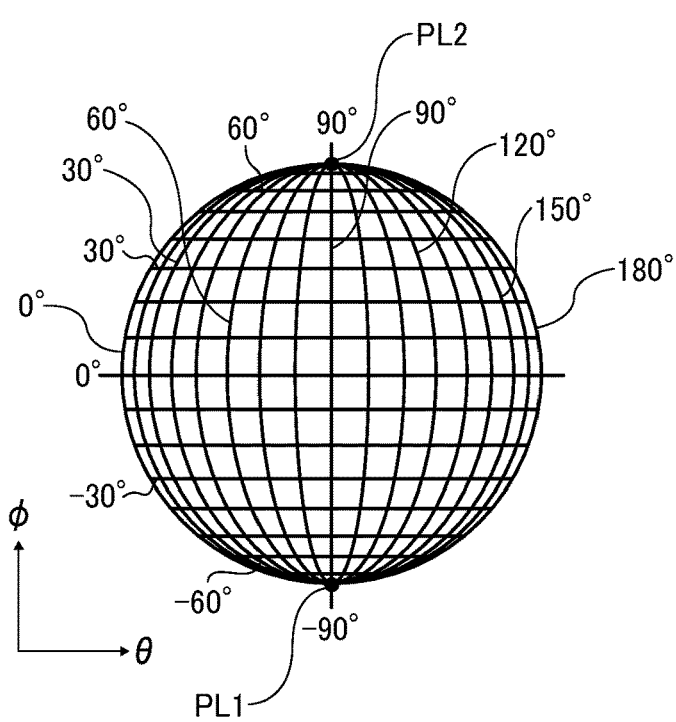
FIG. 8A is an illustration of a spherical image according to an embodiment.
Figure 8B:
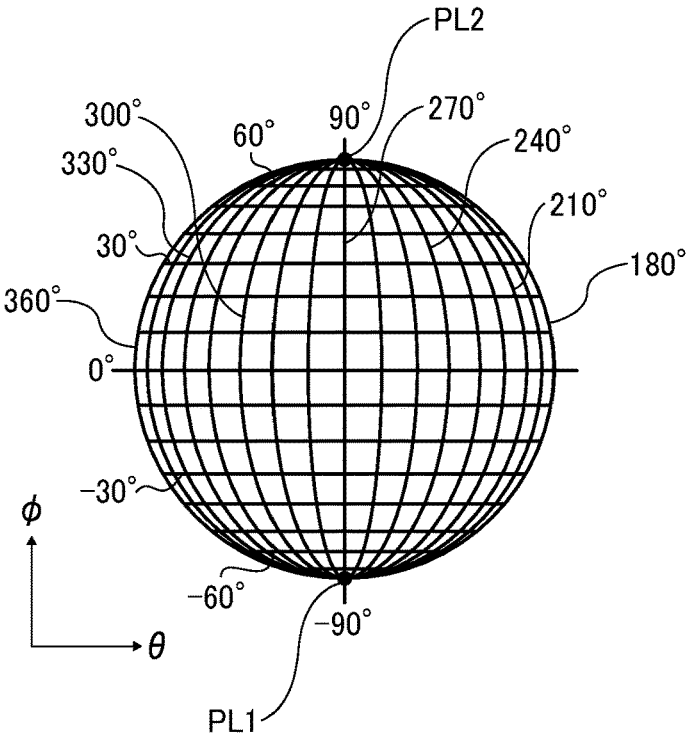
FIG. 8B is an illustration of a spherical image according to another embodiment.

The following describes a process of transforming the position information on a spherical image into coordinates on a planar image transformed from the spherical image. FIG. 8A is an illustration of an example of a spherical image. FIG. 8B is an illustration of another example of a spherical image. FIG. 8A is obtained by connecting locations at which incident angles relative to the optical axis are equal to each other in each of the horizontal direction and the orthogonal direction on a hemispherical image in FIG. 3A. Hereinafter, θ denotes an incident angle relative to the optical axis in the horizontal direction, and φ is an incident angle relative to the optical axis in the vertical direction.

Figure 9A:
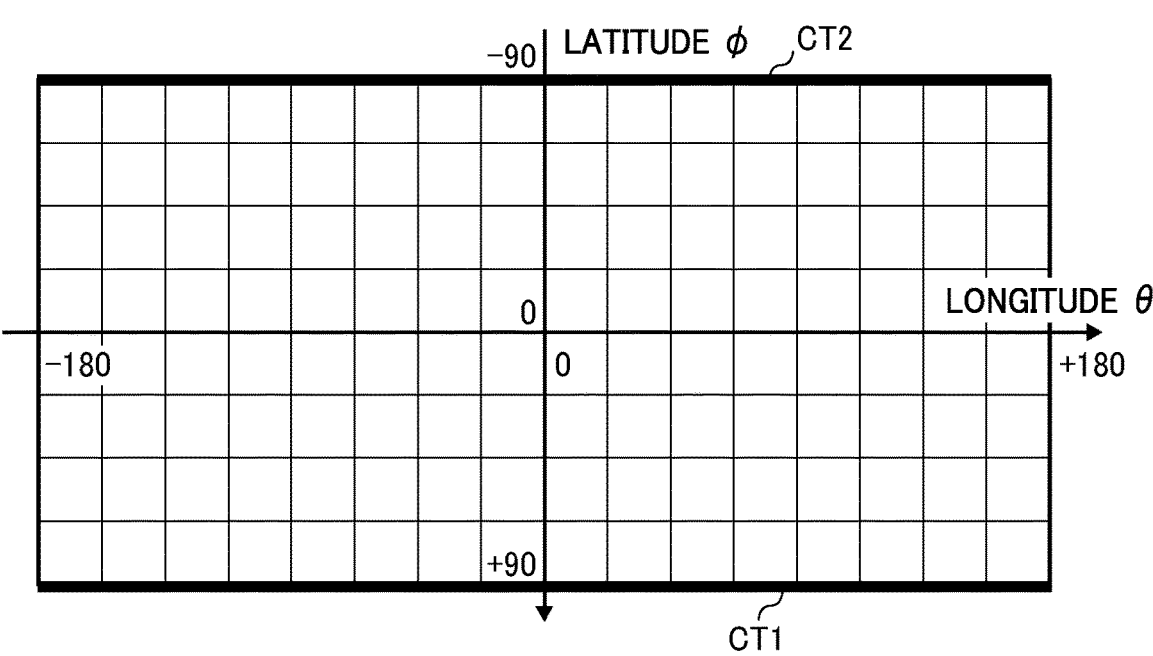
FIG. 9A is an illustration of a planner image transformed from a spherical image, according to an embodiment.

FIG. 9A is an illustration of an image represented by equirectangular projection, according to embodiments. Specifically, the image-capturing apparatus 10 generates a planar image in FIG. 9A by combining the images in FIGS. 8A and 8B associated with each other based on a look up table (LUT) prepared in advance and processed by the equirectangular projection. The equirectangular projection image EC in FIG. 3C is an example of the planar image in FIG. 9A.

In the images processed by the equirectangular projection, the latitude (θ) and the longitude (φ) are orthogonal to each other. In FIG. 9A, any position within the spherical image is represented by coordinates where the center of the image is (0, 0), the latitude direction ranges from −90 to +90, and the longitude direction ranges from −180 to +180. For example, the upper-left coordinates of the image are (−180, −90). The coordinates of the spherical image may be represented in a format using 360 degrees as illustrated in FIG. 9A, or may be represented in radian display or display of the number of pixels as in an actual image. The coordinates of the spherical image may be transformed into two-dimensional coordinates (x, y) as illustrated in FIG. 9B.

Figure 9B:
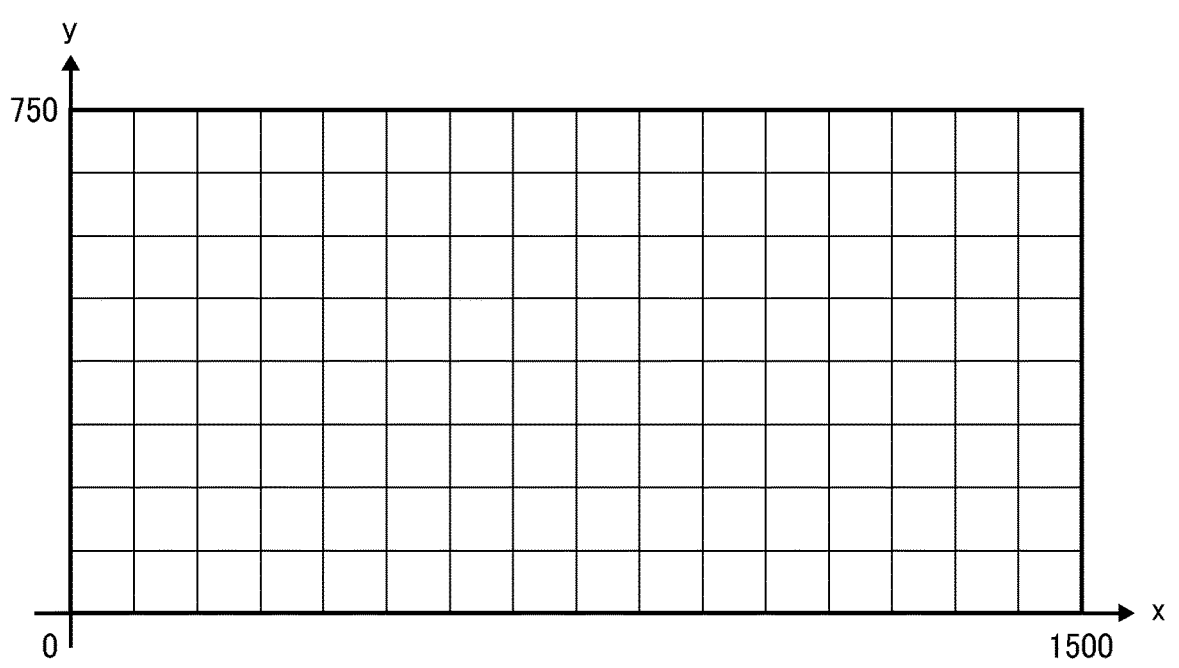
FIG. 9B is an illustration of a planner image transformed from a spherical image, according to another embodiment.

Note that the process of combining the two-dimensional images in FIGS. 9A and 9B is not limited to the process of simply continuously arranging the hemispherical images in FIGS. 8A and 8B. For example, when the horizontal center of the spherical image is not θ=180 degrees in the combining process, the image-capturing apparatus 10 first preprocesses the hemispherical image illustrated in FIG. 3C and arranges the hemispherical image at the center of the spherical image. Next, the image-capturing apparatus 10 may generate an equirectangular projection image EC illustrated in FIG. 3C by dividing an image obtained by pre-processing the hemispherical image illustrated in FIG. 3B into right and left portions of an image to be generated so that the images can be arranged on the left and right portions, and combining the hemispherical images.

In a planar image in FIG. 9A, a portion corresponding to a polar point (PL1 or PL2) of the hemispherical images (spherical image) in FIGS. 8A and 8B is a line segment CT1 or CT2. This is because, as illustrated in FIGS. 4A and 4B, the spherical image (for example, the spherical image CE) is created by mapping the planar image (equirectangular projection image EC) illustrated in FIG. 9A onto a spherical surface by using the open graphics library for embedded systems (OpenGL ES).

Figures 10A, 10B:
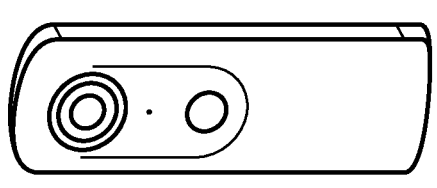
FIG. 10A is an illustration of a special image-capturing apparatus incorporated in the image processing system in FIG. 1.
FIG. 10B is an illustration of a typical image-capturing apparatus incorporated in the image processing system in FIG. 1.

Next, an application example of the image-capturing apparatus 10 in the image processing system 1 according to an embodiment will be described with reference to FIGS. 10A, 10B, and 11. FIGS. 10A and 10B are illustrations of an example of the image-capturing apparatus 10 incorporated in the image processing system 1.

In FIG. 10A, the image-capturing apparatus 10 is a special image-capturing apparatus including multiple image sensors to generate a spherical image using the generating method as described above. The special image-capturing apparatus uses a wide-angle lens or a fish-eye lens having a wide angle of view to capture a spherical image, which is obtained by combining outputs of the image sensors.

In FIG. 10B, the image-capturing apparatus 10 is a typical image-capturing apparatus, or a typical camera, according to a comparative example. The typical image-capturing apparatus is, for example, a typical digital camera or a portable terminal such as a smartphone provided with a camera. A photographer holding such a typical image-capturing apparatus in his/her hand captures multiple images for generating an omnidirectional image while changing his/her orientation to capture an omnidirectional view.

The typical image-capturing apparatus acquires an omnidirectional image by combining captured images. Each of the special image-capturing apparatus and the typical image-capturing apparatus generates a resultant-captured image by joining multiple captured images through image processing (e.g., stitching). In this case, the optical center of such an image-capturing apparatus 10 that acquires multiples captured images is to be stationary.

Figure 11:
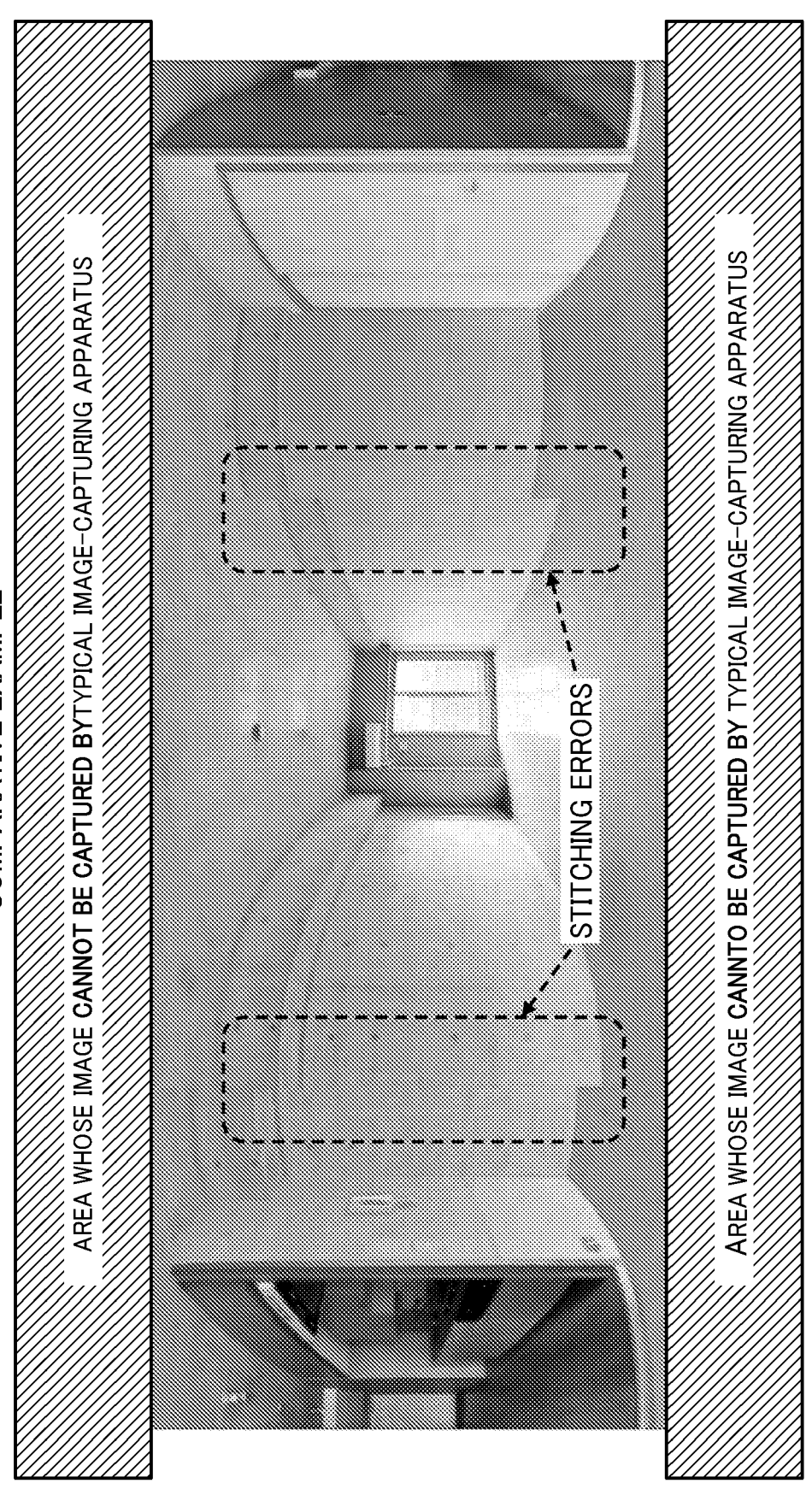
FIG. 11 is an illustration of an example of an image captured by the typical image-capturing apparatus in FIG. 10B, according to a comparative example.

FIG. 11 is an illustration of an example of an image captured by the typical image-capturing apparatus in FIG. 10B, according to a comparative example. More specifically, the image in FIG. 11 is captured with the typical image-capturing apparatus in FIG. 10B by the user (photographer) holding the typical image-capturing apparatus in FIG. 10B in his/her hand while changing his/her orientation. Such a typical image-capturing apparatus, whose angle of view is small (typically, 100 degrees or lower), fails to capture images of the upper and lower poles as illustrated in FIG. 11. Further, the optical center of such an image-capturing apparatus might be offset depending on how the user changes his/her orientation, thus causing disparity during the capturing of images. The disparity between the captured images likely causes stitching errors such as misalignment between the captured images, which causes a resultant image to look unnatural.

In other words, although either one of the special image-capturing apparatus in FIG. 10A and the typical image-capturing apparatus in FIG. 10B is applicable as the image-capturing apparatus 10 according to an embodiment of the present disclosure, the special image-capturing apparatus in FIG. 10A is more suitable. This is because, the image processing system 1 incorporating the special image-capturing apparatus in FIG. 10A (a spherical-image capturing apparatus) provides a high-quality and natural-looking spherical image, which can be used for virtual tours that involve image quality equivalent to those for advertisements. In the following description, the image-capturing apparatus 10 is assumed to be the special image-capturing apparatus (spherical-image capturing apparatus).

Figures 12A, 12B, 12C:
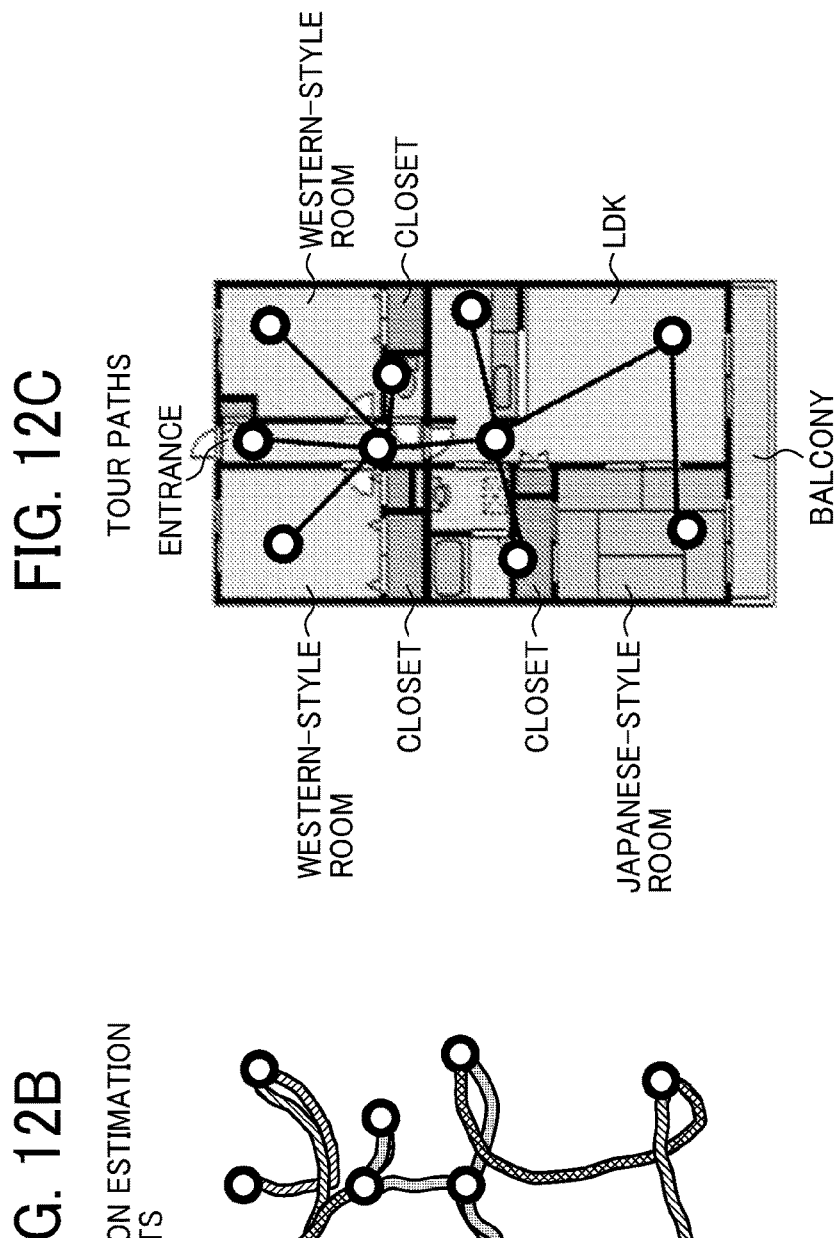
FIGS. 12A, 12B, and 12C are illustrations of a process performed by an image processing apparatus.

Next, a process performed by an image processing apparatus 50 is described with reference to FIGS. 12A, 12B, and 12C. FIGS. 12A, 12B, and 12C are illustrations of the process performed by the image processing apparatus 50, according to an embodiment of the present disclosure. FIGS. 12A, 12B, and 12C are illustrations of the relation between paths that associate the image-capturing positions, at which multiple images have been captured by the image-capturing apparatus 10, with the captured images.

The image processing apparatus 50 uses, for example, visual simultaneous localization and mapping (SLAM) or structure from motion (SFM) to estimate an image-capturing position (FIG. 12A) of an image captured and acquired by the image-capturing apparatus 10. As illustrated in FIG.

12B, the results of estimating the image-capturing position represent image-capturing positions as relative to multiple captured images. In the estimation results, each image-capturing position is represented by one coordinate system.

In addition to the estimation of the image-capturing position, the image processing apparatus 50 restores a route along which the image-capturing apparatus 10 has moved to capture the images, which means that the image processing apparatus 50 restores the order of image-capturing position and the route along which the user has moved to capture images. The image processing apparatus 50 generates a path (tour path) based on the estimated image-capturing position and the route along which the user has moved during capturing of the images. The tour path indicates how multiple captured images are connected to each other in a tour image. As illustrated in FIG. 12C, the images captured at the estimated image-capturing positions, respectively, are connected to each other, to allow the viewer to browse the captured images, which connected to each other, and thus provide a virtual tour using such captured images.

Figure 13:
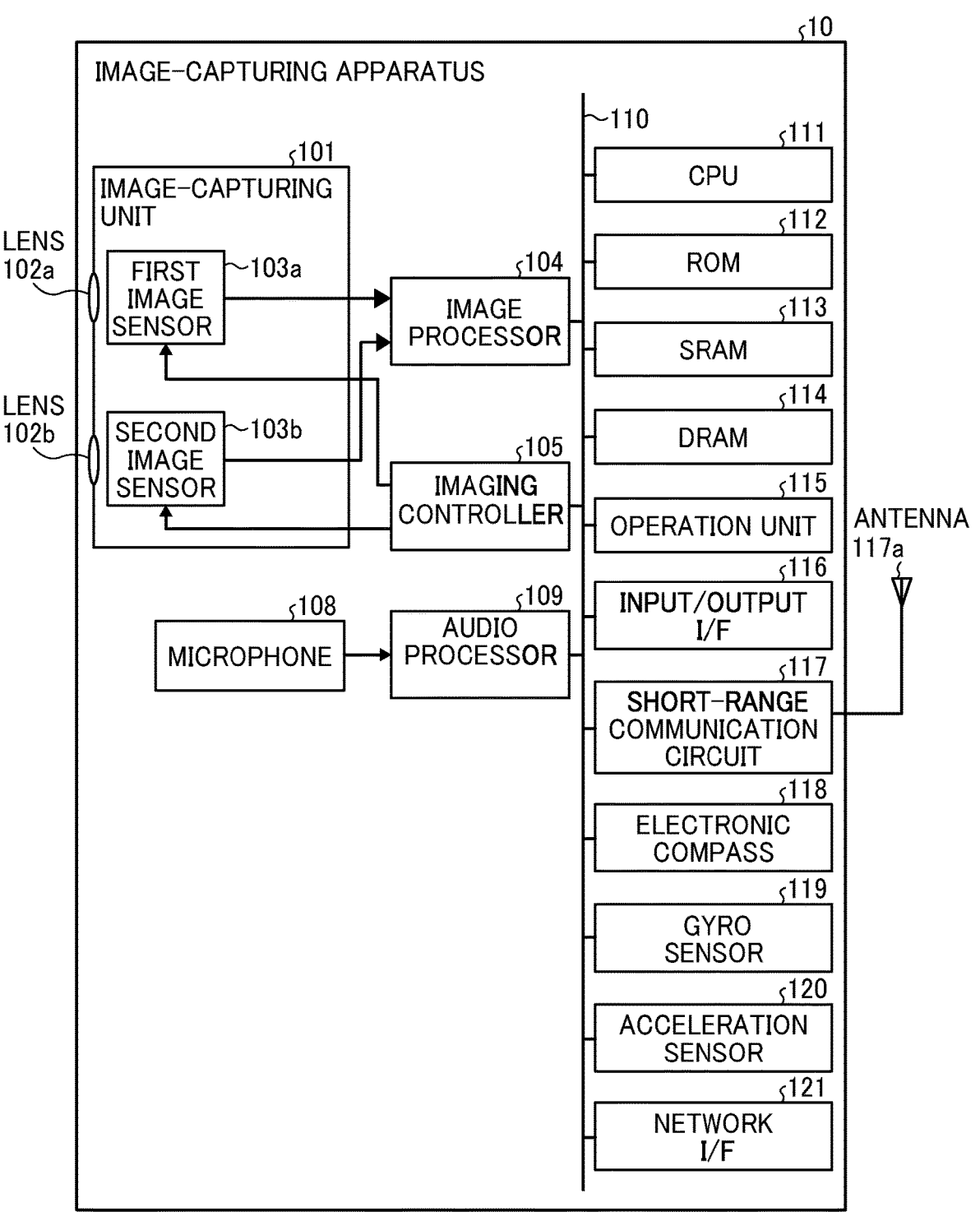
FIG. 13 is a block diagram of a hardware configuration of the image-capturing apparatus in FIG. 10A.
Figure 14:
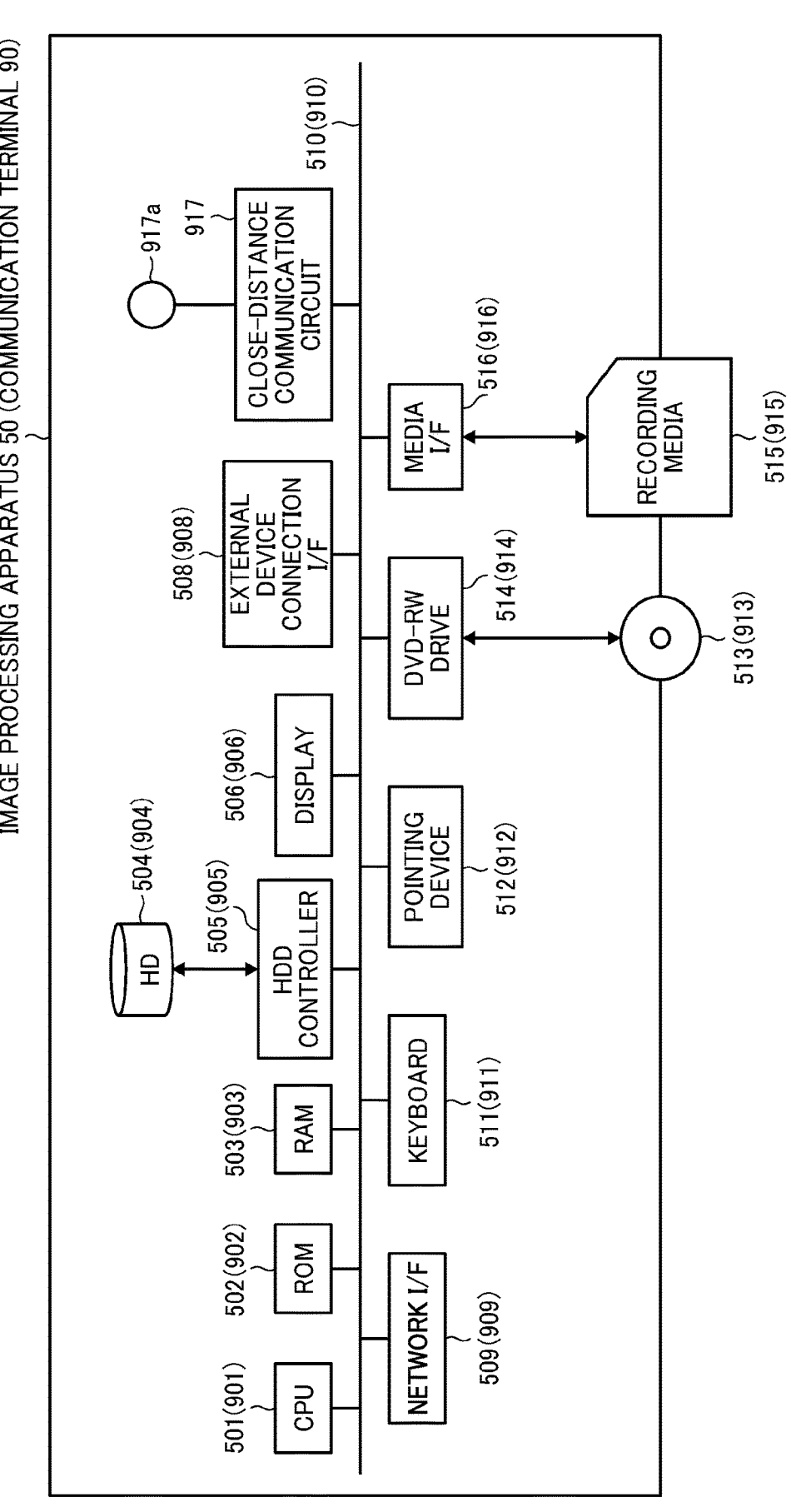
FIG. 14 is an illustration of hardware configurations of an image-processing apparatus and a communication terminal, according to an embodiment of the present disclosure.

Next, referring to FIGS. 13 and 14, hardware configurations of each apparatus, device, and terminal of the image processing system are described according to the exemplary embodiment. In the hardware configurations illustrated in FIG. 14 and FIG. 13, components or elements may be added or deleted as needed.

First, referring to FIG. 13, a hardware configuration of the image-capturing apparatus 10 is described, according to an embodiment. FIG. 13 is a hardware block diagram of the image-capturing apparatus 10. The following describes a case in which the image-capturing apparatus 10 is a spherical (omnidirectional) image capturing device having two imaging elements. However, the image-capturing apparatus 10 may include any suitable number of imaging elements, providing that it includes at least two imaging elements. In addition, the image-capturing apparatus 10 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the image-capturing apparatus 10.

As illustrated in FIG. 13, the image-capturing apparatus 10 includes an image-capturing unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, an input/output interface (I/F) 116, a short-range communication circuit 117, an antenna 117a for the short-range communication circuit 117, an electronic compass 118, a gyro sensor 119, an acceleration sensor 120, and a network I/F 121.

The image-capturing unit 101 includes two wide-angle lenses (so-called fish-eye lenses) 102a and 102b (collectively referred to as lens 102 unless they need to be distinguished from each other), each having an angle of view of equal to or greater than 180 degrees so as to form a hemispherical image. The image-capturing unit 101 further includes the two image sensors 103a and 103b corresponding to the lenses 102a and 102b respectively. The image sensors 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the lenses 102a and 102b into electric signals to output image data. The timing generation circuit generates horizontal or vertical synchronization signals, pixel clocks and the like for the image sensor. Various commands, parameters and the like for operations of the image sensors 103a and 103b are set in the group of registers.

Each of the image sensors 103a and 103b of the image-capturing unit 101 is connected to the image processor 104 via a parallel I/F bus. In addition, each of the image sensors 103a and 103b of the image-capturing unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires image data from each of the image sensors 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the image sensors 103a and 103b each usually functions as a slave device. The imaging controller 105 sets commands and the like in the group of registers of the image sensors 103a and 103b via the serial I/F bus such as the I2C bus. The imaging controller 105 receives various commands from the CPU 111. Further, the imaging controller 105 acquires status data and the like of the group of registers of the image sensors 103a and 103b via the serial I/F bus such as the I2C bus. The imaging controller 105 sends the acquired status data and the like to the CPU 111.

The imaging controller 105 instructs the image sensors 103a and 103b to output the image data at a time when a shutter button of the operation unit 115 is pressed. In some cases, the image-capturing apparatus 10 displays a preview image on a display (e.g., a display of an external terminal such as a smartphone that performs short-range communication with the image-capturing apparatus 10 through the short-range communication circuit 117) or displays a moving image (movie). In case of displaying movie, the image data are continuously output from the image sensors 103a and 103b at a predetermined frame rate (frames per minute).

Furthermore, the imaging controller 105 operates in cooperation with the CPU 111 to synchronize the time when the image sensor 103a outputs image data and the time when the image sensor 103b outputs the image data. It should be noted that, although the image-capturing apparatus 10 does not include a display in this embodiment, the image-capturing apparatus 10 may include the display. The microphone 108 converts sounds to audio data (signal). The audio processor 109 acquires the audio data output from the microphone 108 via an I/F bus and performs predetermined processing on the audio data.

The CPU 111 controls entire operation of the image-capturing apparatus 10, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, a power switch, the shutter button, and a touch panel having functions of both displaying information and receiving input from a user, which can be used in combination. The user operates the operation unit 115 to input various image capturing (photographing) modes or image capturing (photographing) conditions.

The input/output I/F 116 collectively refers to an interface circuit such as a USB I/F that allows the image-capturing apparatus 10 to communicate data with an external medium such as an SD card or an external personal computer. The input/output I/F 116 supports at least one of wired and wireless communications. The data of the equirectangular projection image, which is stored in the DRAM 114, is stored in the external medium via the input/output I/F 116 or transmitted to an external terminal (apparatus) via the input/output I/F 116, as needed.

The short-range communication circuit 117 communicates data with the external terminal (apparatus) via the antenna 117a of the image-capturing apparatus 10 by short-range wireless communication such as NFC, Bluetooth, and Wi-Fi. The short-range communication circuit 117 transmits the data of equirectangular projection image to an external terminal (apparatus).

The electronic compass 118 calculates an orientation of the image-capturing apparatus 10 from the Earth's magnetism to output orientation information. This orientation and tilt information is an example of related information, which is metadata described in compliance with Exif. This information is used for image processing such as image correction of captured images. The related information also includes a date and time when the image is captured by the image-capturing apparatus 10, and a data size of the image data. The gyro sensor 119 detects the change in tilt of the image-capturing apparatus 10 (roll, pitch, yaw) with movement of the image-capturing apparatus 10. The change in angle is one example of related information (metadata) described in compliance with Exif. This information is used for image processing such as image correction of captured images. The acceleration sensor 120 detects acceleration in three axial directions. The image-capturing apparatus 10 calculates position (an angle with respect to the direction of gravity) of the image-capturing apparatus 10, based on the acceleration detected by the acceleration sensor 120. With the gyro sensor 119 and the acceleration sensor 120, the image-capturing apparatus 10 is able to correct tilt of image with high accuracy. The network I/F 121 is an interface for performing data communication, via such as a router, using the communication network 100 such as the Internet.

First, the hardware configuration of the image processing apparatus 50 is described with reference to FIG. 14. FIG. 14 is a diagram of a hardware configuration of the image processing apparatus 50. Each hardware element of the image processing apparatus 50 is denoted by a reference numeral in 500 series. The communication management apparatus 50A is implemented by a computer as illustrated in FIG. 14 including a CPU 501, a ROM 502, a random access memory (RAM) 503, hard disk (HD) 504, a hard disk drive (HDD) controller 505, a display 506, an external device connection I/F 508, a network I/F 509, a bus line 510, a keyboard 511, a pointing device 512, a digital versatile disk rewritable (DVD-RW) drive 514, and a medium I/F 516.

The CPU 501 controls the overall operation of the image processing apparatus 50. The ROM 502 stores programs such as an initial program loader (IPL) to boot the CPU 501. The RAM 503 is used as a work area for the CPU 501. The HD 504 stores various data such as a control program. The HDD controller 505 controls reading or writing of various data to or from the HD 504 under control of the CPU 501. The display 506 displays various information such as a cursor, menu, window, characters, or image. In one example, the display 506 is a touch panel display provided with an input device. The external device connection I/F 508 is an interface that connects the communication management apparatus 50A to various external devices. Examples of the external devices include, but are not limited to, a USB memory. The network I/F 509 is an interface that controls data communication performed with an external device through the communication network 100. The bus line 510 is, for example, an address bus or a data bus, which electrically connects the elements such as the CPU 501 illustrated in FIG. 14.

The keyboard 511 is an example of an input device including a plurality of keys for inputting characters, numerical values, various instructions, and the like. The pointing device 512 is an example of an input device that allows a user to select or execute a specific instruction, select a target for processing, or move a cursor being displayed. The input device is not limited to the keyboard 511 and the pointing device 512, and may be a touch panel, a voice input device, or the like. The DVD-RW drive 514 controls reading or writing of various data from or to a DVD-RW 513, which is an example of a removable storage medium. In alternative to the DVD-RW, any storage medium may be used such as a digital versatile disk-recordable (DVD-R) and Blu-ray® disk. The medium I/F 516 controls reading or writing (storing) of data from or to a storage medium 515 such as a flash memory.

FIG. 14 is a hardware block diagram of a communication terminal 90 according to an embodiment of the present disclosure. Each hardware element of the communication terminal 90 is denoted by a reference numeral in 900 series. The communication terminal 90 is implemented by one or more computers having substantially the same configuration as that of the image processing apparatus 50 as illustrated in FIG. 14, and thus the description of hardware configuration is omitted. The communication terminal 90 includes a short-range communication circuit 917 and an antenna 917a of the short-range communication circuit 917. The short-range communication circuit 917 is a communication circuit that communicates in compliance with the near field communication (NFC) or the BLUETOOTH (registered trademark) or Wi-Fi, for example.

Any one of the above-described control programs may be recorded in a file in a format installable or executable on a computer-readable storage medium for distribution. Examples of the storage medium include, but are not limited to, a compact disc-recordable (CD-R), a DVD, a Blu-ray® disk, a secure digital (SD) card, and a USB memory. In addition, such recording medium may be provided in the form of a program product to users within a certain country or outside that country. For example, the image processing apparatus 50 implements an information processing method according to an embodiment of the present invention by executing a program according to an embodiment of the present invention.

Figure 15:
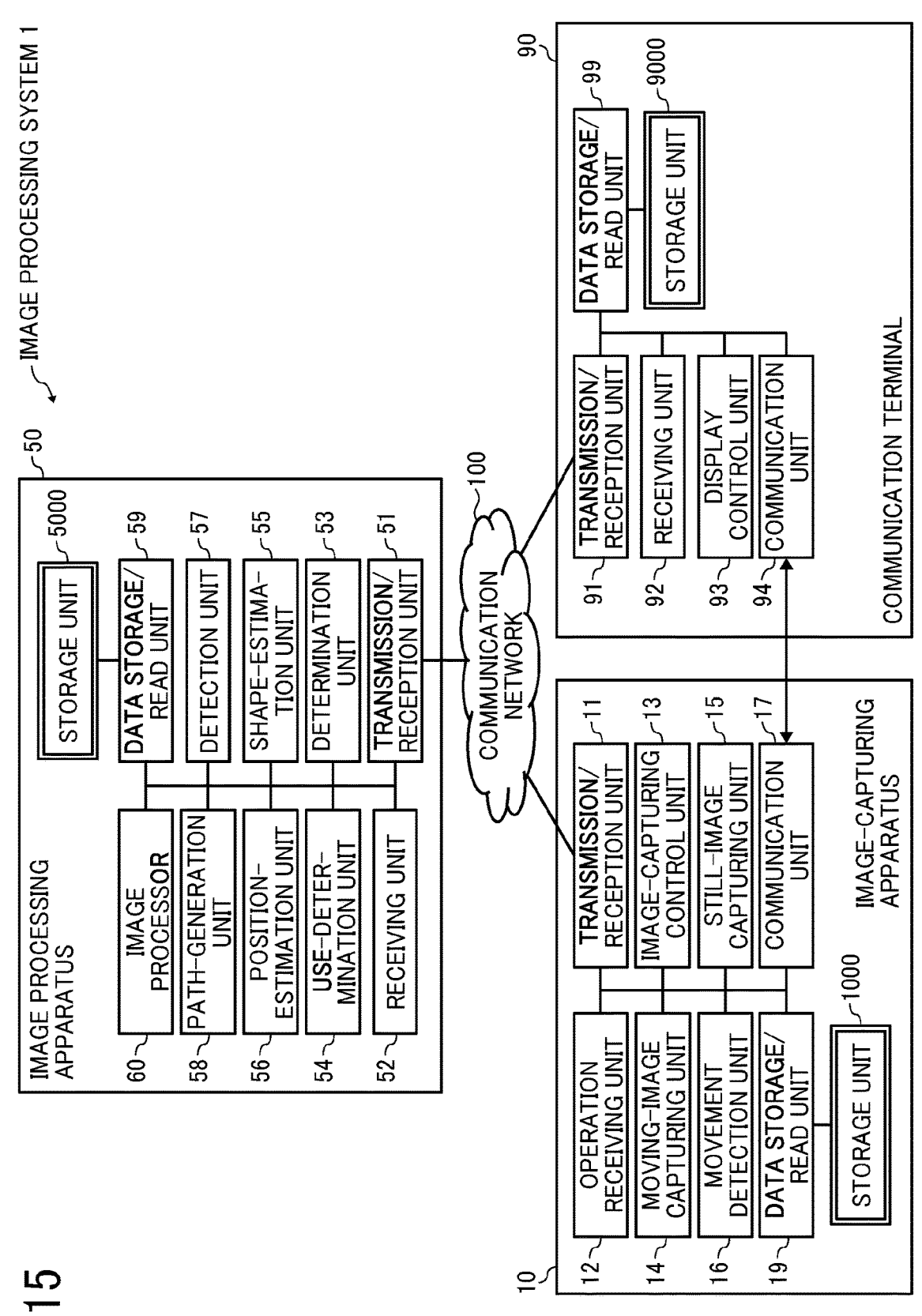
FIG. 15 is a diagram of a functional configuration of an image processing system.

Next, a functional configuration of the image processing system according to an embodiment will be described with reference to FIG. 15. FIG. 15 is a functional block diagram of an image processing system according to an embodiment. FIG. 15 illustrates a part of apparatuses and terminals of FIG. 1, which are related to processing or operation described below.

Referring to FIG. 15, a functional configuration of the image-capturing apparatus 10 is described according to an embodiment of the present disclosure. The image-capturing apparatus 10 includes a transmission/reception unit 11, an operation receiving unit 12, an image-capturing control unit 13 (image-capturing control means), a moving-image capturing unit 14, a still-image capturing unit 15, a movement detection unit 16, a communication unit 17, and a data storage/read unit 19. These units are functions that are implemented by or that are caused to function by operating any of the elements illustrated in FIG. 13 in cooperation with the instructions of the CPU 111 according to the control program for the image-capturing device expanded from the SRAM 113 to the DRAM 114. The image-capturing apparatus 10 further includes a storage unit 1000, which is implemented by the ROM 112, the SRAM 113, or the DRAM 114 illustrated in FIG. 13. The storage unit 1000 stores a Globally Unique Identifier (GUID) identifying the own device (i.e., the image-capturing apparatus 10).

The transmission/reception unit 11 is implemented by instructions of the CPU 111, and transmits or receives various data or information to or from other device or terminal. Furthermore, the transmission/reception unit 11 communicates data with other device or terminal via the communication network 100 via the network I/F 121.

The operation receiving unit 12 is implemented by the operation unit 115, which operates according to the instructions of the CPU 111, to receive various selections or inputs from the user as the photographer.

The image-capturing control unit 13 is implemented by the image-capturing unit 101, the image processor 104, and the imaging controller 105, illustrated in FIG. 11, each operating according to the instructions of the CPU 111. The image-capturing control unit 13 captures an image of the object or surroundings (for example, scenery) to obtain captured image data. The image-capturing control unit 13, for example, switches between a moving-image capturing mode to capture a moving image by the moving-image capturing unit 14 and a still-image capturing mode to capture a still image by the still-image capturing unit 15 in a time-division manner.

The moving-image capturing unit 14 is implemented by the image-capturing unit 101, the image processor 104, and the imaging controller 105, illustrated in FIG. 11, each operating according to the instructions of the CPU 111, so as to allow the image-capturing apparatus 10 to capture a moving image. The moving-image capturing unit 14 captures a moving image while the user of the image-capturing apparatus 10 is moving inside a structure such as a real estate property, which is a predetermined site. The moving-image capturing unit 14 captures a moving image in low-resolution continuous frames while the user (photographer) holding the image-capturing apparatus 10 is moving, and stores captured image data in the storage unit 1000. The moving-image capturing unit 14 captures a moving image while the user holding the image-capturing apparatus 10 movies from a first location (point) to a second location (point) within a real estate property, which is a predetermined site.

The still-image capturing unit 15 is implemented by the image-capturing unit 101 in FIG. 13 to allow the image-capturing apparatus 10 to capture a still image of the object or surroundings (for example, scenery). The still-image capturing unit 15, for example, captures multiple still images at different image-capturing positions inside a structure such as a real estate property, which is a predetermined site. The still-image capturing unit 15 captures a still image (picture) at higher resolution than that of the moving image captured by the moving-image capturing unit 14, and stores captured image data in the storage unit 1000. The still image captured by the still-image capturing unit 15 may be an image of one frame or a high dynamic range (HDR) image obtained by combining multiple images.

The still image captured by the still-image capturing unit 15 has a high resolution of 4K or higher, for example. The moving image captured by the moving-image capturing unit 14, which is used for estimation of image-capturing position (the position estimation), may have lower resolution than those of the captured still images as long as the captured moving image allows the identification of an object reflected in the moving image. The moving image may have a resolution of about 480 p or lower, for example. The image-capturing apparatus 10 that captures a low-resolution moving image enables a reduction in the total amount of data to be captured for the tour.

The movement detection unit 16 is implemented by the gyroscopic sensor 119 and the acceleration sensor 120 in FIG. 13, each operates according to the instructions of the CPU 111. The movement detection unit 16 detects movement of the image-capturing apparatus 10. The movement detection unit 16 detects, for example, whether the user (photographer) holding the image-capturing apparatus 10 is moving (i.e., the image-capturing apparatus 10 is in a moving state) or standing still (i.e., the image-capturing apparatus 10 is in a stationary state) during capturing of images by the image-capturing apparatus 10.

The communication unit 17 is implemented by the input/output I/F 116 and the short-range communication circuit 117, each operating according to the instructions of the CPU 111. The communication unit 17 transmits or receives various data or information to or from another device or terminal. For example, the communication unit 17 communicates data with the communication terminal 90 via any desired cable via the input/output I/F 116. The communication unit 17 communicates data with the communication terminal 90 using, for example, the short-range communication circuit 117, based on short-range wireless communication technology.

The data storage/read unit 19, which is implemented by the instructions of the CPU 111, stores various data or information in the storage unit 1000 or reads out various data or information from the storage unit 1000. The storage unit 1000 further stores image data acquired by the captured by the moving-image capturing unit and the still-image capturing unit 15. The image data stored in the storage unit 1000 is associated with the image-capturing time of the captured image as metadata.

Referring to FIG. 15, a functional configuration of the image processing apparatus 50 is described according to an embodiment. The image processing apparatus 50 includes a transmission/reception unit 51 (still-image acquisition means, moving-image acquisition means), a receiving unit 52, a determination unit 53, a use-determination unit 54, a shape-estimation unit 55, a position-estimation unit 56 (position estimation means), a detection unit 57, a path-generation unit 58 (path generation means), an image processor 60 (image processing means), and a data storage/read unit 59. These units are functionality implemented by or caused to function by operating any of the hardware elements illustrated in FIG. 14 in cooperation with the instructions of the CPU 501 according to the control program for the image processing apparatus, the control program being expanded from the HD 504 to the RAM 503. The image processing apparatus 50 further includes a storage unit 5000, which is implemented by the ROM 502, the RAM 503 and the HD 504 illustrated in FIG. 14.

The transmission/reception unit 51 is implemented by the network I/F 509 that operates according to instructions of the CPU 501. The transmission/reception unit 51 transmits or receives various data or information to or from other apparatuses or terminals through the communication network 100. The transmission/reception unit 51 receives (acquires), for example, a moving image captured by the image-capturing apparatus 10 from the image-capturing apparatus 10 or the communication terminal 90. The transmission/reception unit 51 receives (acquires), for example, a still image captured by the image-capturing apparatus 10 from the image-capturing apparatus 10 or the communication terminal 90.

The receiving unit 52, which is implemented by the keyboard 511 or the pointing device 512 that operates according to instructions of the CPU 501, receives various selections or inputs from the user. The determination unit 53, which is implemented by instructions of the CPU 501, performs various determinations.

The use-determination unit 54, which is implemented by the CPU 501, determines, based on an image of an omnidirectional view of a space inside a structure, the intended use of the space reflected in the image. The intended use refers to a classification, a genre, or an intended use of a space whose image is actually captured by the image-capturing apparatus 10. In a case where an object to be captured by the image-capturing apparatus 10 is a real estate property as an image-capturing site, the intended use of a room which is a space reflected in the captured image is, for example, a toilet, a bathroom, or an entrance.

The shape-estimation unit 55, which is implemented by the CPU 501, estimates, based on an image of an omnidirectional view of a space inside a structure, the shape of the space reflected in the image.

The position-estimation unit 56, which is implemented by the CPU 501, estimates, based on a moving image acquired from the image-capturing apparatus 10, a relative image-capturing position of a still image acquired from the image-capturing apparatus 10. The position-estimation unit 56 uses, for example the visual SLAM or SfM to estimate a relative image-capturing position of a still image, at which the still image has been captured by the image-capturing apparatus 10, from a moving image, or low-resolution continuous frames. The visual SLAM or SfM enables calculation of the position of a feature point on an image, the position of a camera, and parameters from multiple images. The calculated position is a relative position, and a reference position is to be used to obtain an absolute position.

The detection unit 57, which is implemented by the CPU 501, detects image-capturing points of a moving image that belongs to the spatial shape (the shape of the space captured) estimated by the shape-estimation unit 55. The image-capturing points of the moving image refer to, for example, coordinates obtained by restoring a movement path during the capturing of the moving image.

The path-generation unit 58, which is implemented by the CPU 501, generates a path indicating the relation of connection between multiple still images based on the image-capturing positions estimated by the position-estimation unit 56. The path-generation unit 58 generates a path that associates still images, which are closest to each other among the multiple still images, with each other based on the estimated image-capturing positions.

The image processor 60, which is implemented by the CPU 501, performs images processing for generating a tour image for the virtual tour based on the image-capturing positions estimated by the position-estimation unit 56. The image processor 60 generates, for example, a tour image that is a processed image including multiple still images associated with each other based on the estimated image-capturing position. The image processor 60 determines a position where a still image is to be arranged in the tour image from the estimated image-capturing position of the still image, the image-capturing time of the still image, and the path (tour path) generated by the path-generation unit 58.

The storage/read unit 59, which is implemented by instructions of the CPU 501, stores various data or information in the storage unit 5000 or reads out various data or information from the storage unit 5000. Further, the storage unit 5000 stores a tour image created by the image processor 60.

Next, referring to FIG. 15, a functional configuration of the communication terminal 90 is described according to an embodiment. The communication terminal 90 includes a transmission/reception unit 91, a receiving unit 92, a display control unit 93 (display control means), a communication unit 94, and a data storage/read unit 99. These units are functions implemented by or caused to function by operating any of the hardware elements illustrated in FIG. 15 in cooperation with the instructions of the CPU 901 according to the communication terminal control program expanded from the HD 904 to the RAM 903. The communication terminal 90 further includes a storage unit 9000, which is implemented by the ROM 902, the RAM 903, and the HD 904, illustrated in FIG. 15.

The transmission/reception unit 91 is implemented by the network I/F 909 that operates according to instructions of the CPU 901. The transmission/reception unit 91 transmits or receives various data or information to or from other apparatuses or terminals through the communication network 100.

The receiving unit 92, which is implemented by the keyboard 911 or the pointing device 912 that operates according to instructions of the CPU 901, receives various selections or inputs from the user.

The display control unit 93, which is implemented by the instructions of the CPU 901, controls the display 906 to display various screens including various images or texts. The display control unit 93 accesses the image processing apparatus 50 using, for example, a web browser or a dedicated application, and causes the display 906 to display an image corresponding to data distributed from the image processing apparatus 50.

The communication unit 94 is implemented by the external-device connection I/F 908 or the short-range communication circuit 917, each operating according to the instructions of the CPU 901. The communication unit 94 transmits or receives various data or information to or from other device or terminal. The communication unit 94 communicates data with the image-capturing apparatus 10 using, for example, the external-device connection I/F 908 via any desired cable. The communication unit 94 communicates data with the image-capturing apparatus 10 using, for example, the short-range communication circuit 917, based on short-range wireless communication technology.

The storing/read unit 99, which is implemented by instructions of the CPU 901, stores various data or information in the storage unit 9000 or reads out various data or information from the storage unit 9000.

Figure 16:
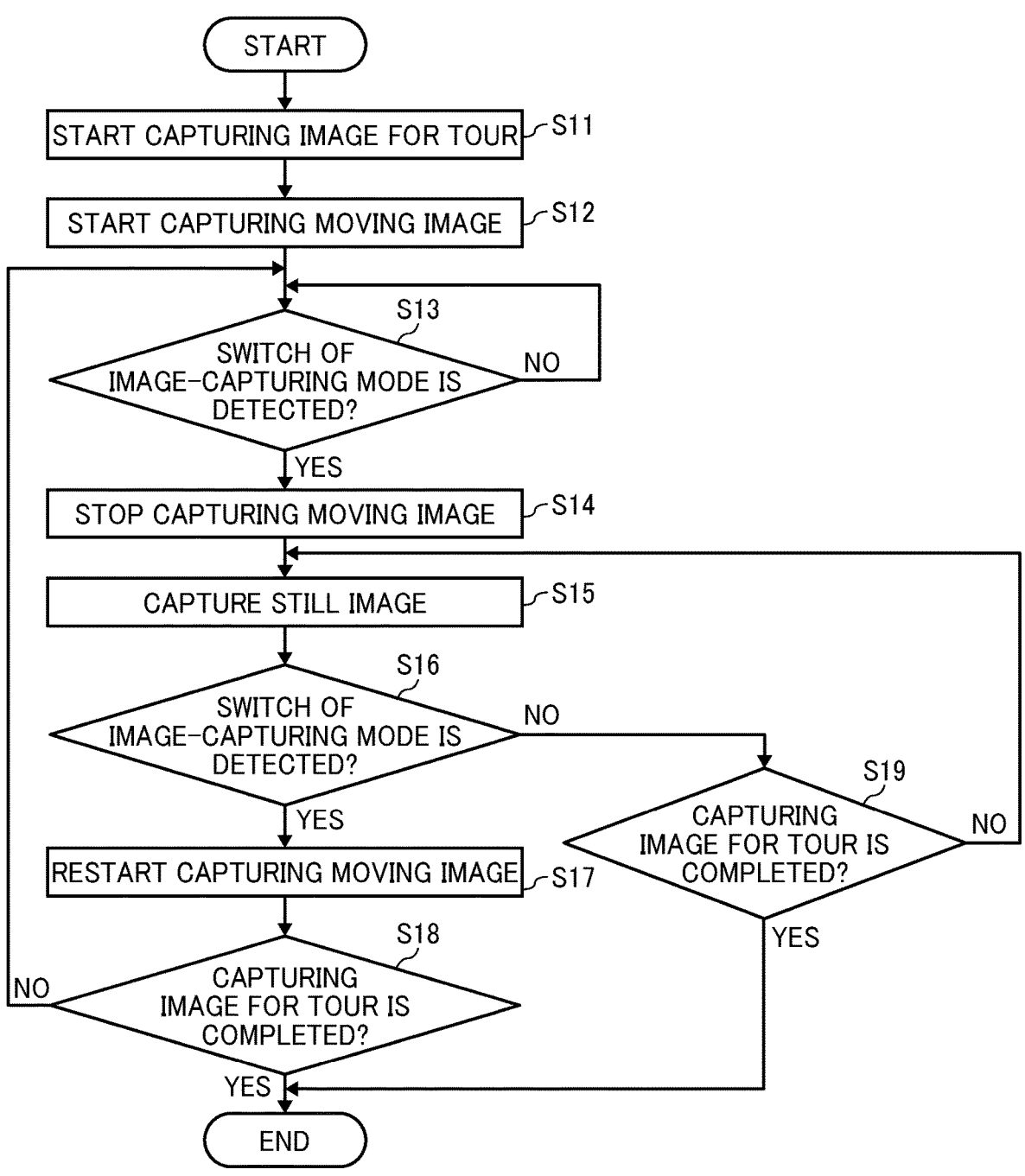
FIG. 16 is a flowchart of a process of capturing an image for tour.

Next, processes or operations of the image processing system according to an embodiment is described with reference to FIGS. 16 to 29. In the following description, a room that is a real estate property is an example of a space inside a structure that a predetermined site. First, with reference to FIGS. 16 to 20, a process of acquiring a captured image used for generating a tour image, which is by the image processing apparatus 50 is described. FIG. 16 is a flowchart of processes of capturing an image for tour, which is performed by the image-capturing apparatus 10.

First, the image-capturing apparatus 10 starts capturing an image for tour (tour-image capturing) in response to a certain request from the communication terminal 90 (step S11). The capturing of an image for tour refers to capturing of an image within a predetermined site to provide a virtual tour. Specifically, the communication terminal 90 starts up and executes an installed dedicated application or accesses a predetermined Web site using a Web browser, to allow the capturing of an image for tour. Then, the communication unit 94 of the communication terminal 90 transmits a request to capture an image for tour (tour-image capturing) to the image-capturing apparatus 10. The image-capturing apparatus 10 starts a process of capturing an image for tour in response to receiving the request by the communication unit 17.

Next, the moving-image capturing unit 14 of the image-capturing apparatus 10 starts capturing a moving image during movement of the image-capturing apparatus 10 that is held by the user moving within the site (step S12). Specifically, the image-capturing control unit 13 issues, to the moving-image capturing unit 14, a request to start capturing a moving image in response to starting capturing an image for tour by the image-capturing apparatus 10. Then, the moving-image capturing unit 14 starts capturing a moving image in response to receiving the request from the image-capturing control unit 13.

Figure 17A:
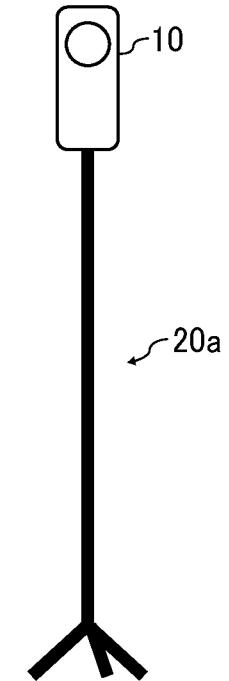
FIG. 17A is an illustration for describing a method of making the image-capturing apparatus stationary, according to an embodiment of the present disclosure.
Figure 17B:
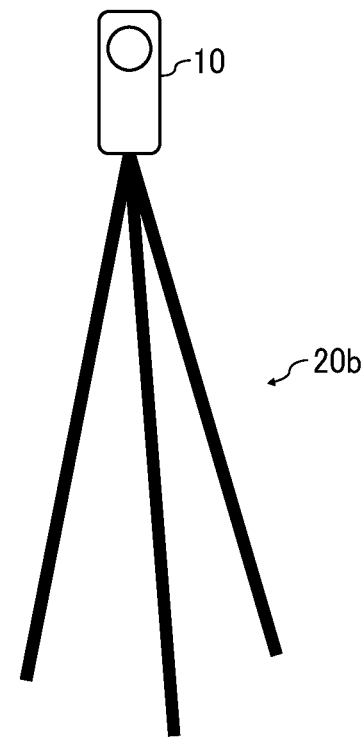
FIG. 17B is an illustration for describing a method of making the image-capturing apparatus stationary, according to another embodiment of the present disclosure.

The following describes an image-capturing method performed by the image-capturing apparatus 10 according to an embodiment, with reference to FIGS. 17 and 18. FIG. 17A is an illustration for describing a method of making the image-capturing apparatus stationary, according to an embodiment of the present disclosure. The image-capturing apparatus 10 is fixed to a support 20 such as a unipod 20a as illustrated in FIG. 17A or a tripod 20b as illustrated in FIG. 17B so as to prevent the user (photographer) from being reflected in a captured image. Further, the image-capturing apparatus 10 is fixed at a height desired for viewing captured images. For example, the image-capturing apparatus 10 is to be disposed at the height of the line of sight of a person in order to allow the real-estate property to look naturally.

Figure 18B:
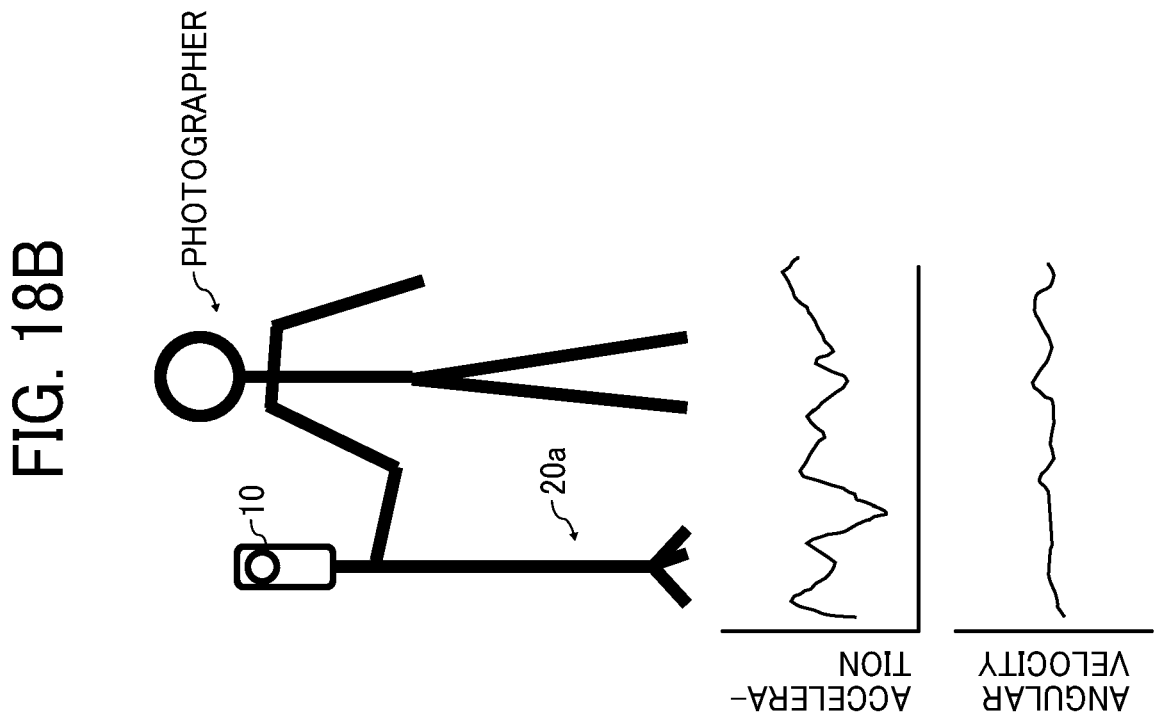
FIGS. 18A and 18B are illustrations of a difference in image-capturing mode between a hand-held mode and a stationary mode.
Figure 18A:
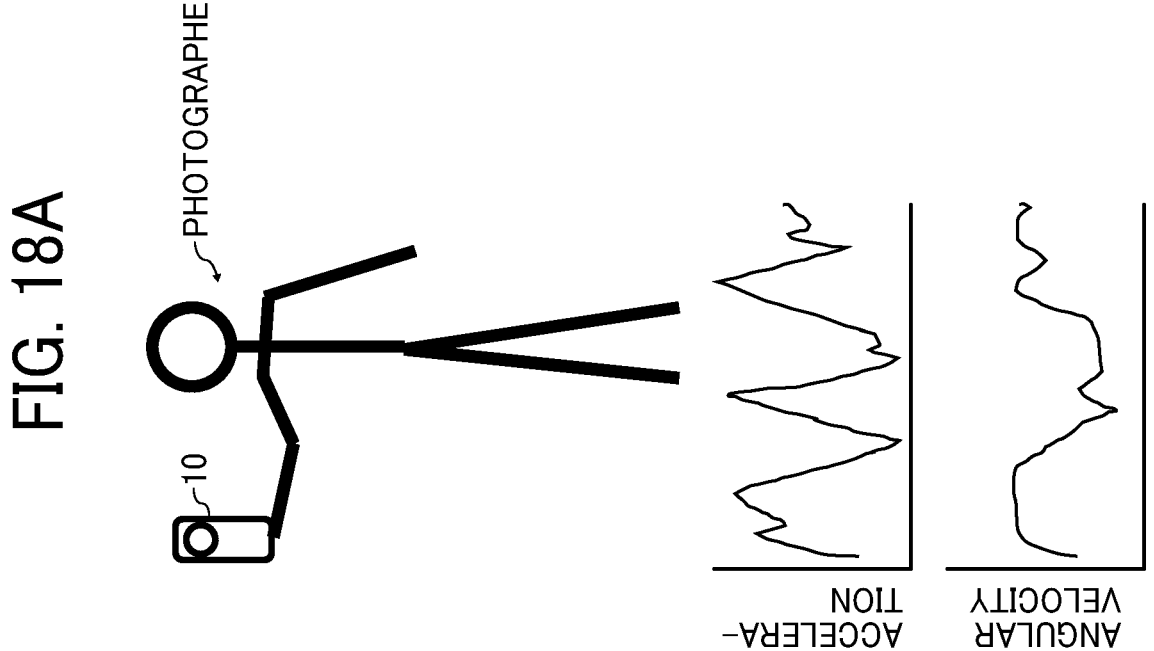

FIGS. 18A and 18B are illustrations of differences in image-capturing mode between a hand-held mode and a stationary mode. FIGS. 18A and 18B demonstrate a difference in physical motion between the hand-held mode at which the photographer (user) holds the image-capturing apparatus 10 in his/her hand during capturing of images and the stationary mode at which the image-capturing apparatus 10 is fixed to the unipod 20a to capture an image. As illustrated in FIGS. 17A and 17B, it is easy for the user (photographer) to capture images while moving with the image-capturing apparatus 10 attached to the support 20 such as the unipod 20a during the moving image-capturing. This, however, causes a difference in physical motion between the hand-held mode and the stationary mode.

Specifically, for example, attaching the image-capturing apparatus 10 to a relatively long and large unipod 20*a* increases the physical moment and attenuates the motion of the image-capturing apparatus itself.

U.S. Pat. No. 10,375,306 estimates a position using a sensor such as the IMU and estimates the image-capturing position by the pedestrian dead reckoning (PDR). However, since the stationary mode with the image-capturing apparatus 10 fixed to the unipod 20*a* enables an attenuation in variations in acceleration and angular velocity as illustrated in FIGS. 18A and 18B, the estimation of the image-capturing position disclosed by U.S. Pat. No. 10,375,306 might fail to obtain accurate results. In view of this, the image processing system 1 uses an image processing method to be described later so as not to deteriorate the processing accuracy even with the image-capturing apparatus 10 fixed to the support 20 such as the unipod 20*a* to prevent reflection of the photographer in a captured image.

Returning to FIG. 16, in response to detecting that an image-capturing mode has been switched between the moving-image capturing mode and the still-image capturing mode by the image-capturing apparatus 10 (YES in step S13), the process proceeds to step S14. In this case, the image-capturing apparatus 10 switches from the moving-image capturing mode to the still-image capturing mode. In response to, for example, pressing the shutter button of the operation unit 115 of the image-capturing apparatus 10 by the photographer (user), the image-capturing apparatus 10 switches from the moving-image capturing mode to the still-image capturing mode. The image-capturing apparatus 10 detects switch of the image-capturing mode. In addition, the image-capturing apparatus 10 may be configured to switch from the moving-image capturing mode to the still-image capturing mode in response to detecting that the image-capturing apparatus 10 comes to rest (i.e., the image-capturing apparatus 10 is in the stationary state) by the movement detection unit 16. In response to detecting that the image-capturing mode has not been switched (NO in step S13), the moving-image capturing unit 14 of the image-capturing apparatus 10 continues the operation of step S12, i.e., capturing a moving image.

Next, the moving-image capturing unit 14 of the image-capturing apparatus 10 stops capturing a moving image in step S14 in response to detecting that the image-capturing mode has been switched (YES in step S13). Then, the still-image capturing unit 15 captures a still image in response to the user pressing the shutter button of the operation unit 115 (step S15).

Next, similarly to the process in step S13, in response to detecting that the image-capturing mode has been switched by the image-capturing apparatus 10 (YES in step S16), the process proceeds to step S18. In this case, the image-capturing apparatus 10 switches from the still-image capturing mode to the moving-image capturing mode. For example, the image-capturing apparatus 10 switches from the still-image capturing mode to the moving-image capturing mode in response to detecting that the image-capturing apparatus 10 restart moving by the movement detection unit 16. In addition, the image-capturing apparatus 10 may be configured to switch from the still-image capturing mode to the moving-image capturing mode after capturing a still image by the still-image capturing unit 15.

The moving-image capturing unit 14 of the image-capturing apparatus 10 restarts capturing a moving image in step S17 in response to detecting that the image-capturing mode has been switched (YES in step S16). Similarly to step S12, the moving-image capturing unit 14 of the image-capturing apparatus 10 continues capturing a moving image during movement of the image-capturing apparatus 10 that is held by the user moving within the site. Then, when capturing an image for tour is completed (YES in step S18), the image-capturing apparatus 10 ends the processing. Whether capturing an image for tour is completed is determined based on, for example, a certain operation on the image-capturing apparatus 10 or the communication terminal 90 by the photographer. When capturing an image for tour is not completed (NO in step S18), the image-capturing apparatus 10 returns to step S13 and repeats the operations following step S13 to continue capturing an image for tour.

In response to detecting that the image-capturing mode has not been switched (NO in step S16), the image-capturing apparatus 10 proceeds to step S19. Then, similarly to step S18, when capturing an image for tour is completed (YES in step S19), the image-capturing apparatus 10 ends the processing. When capturing an image for tour is not completed (NO in step S19), the image-capturing apparatus 10 returns to step S19 and repeats the operations following step S19 to continue capturing a still image by the still-image capturing unit 15.

Figure 19:
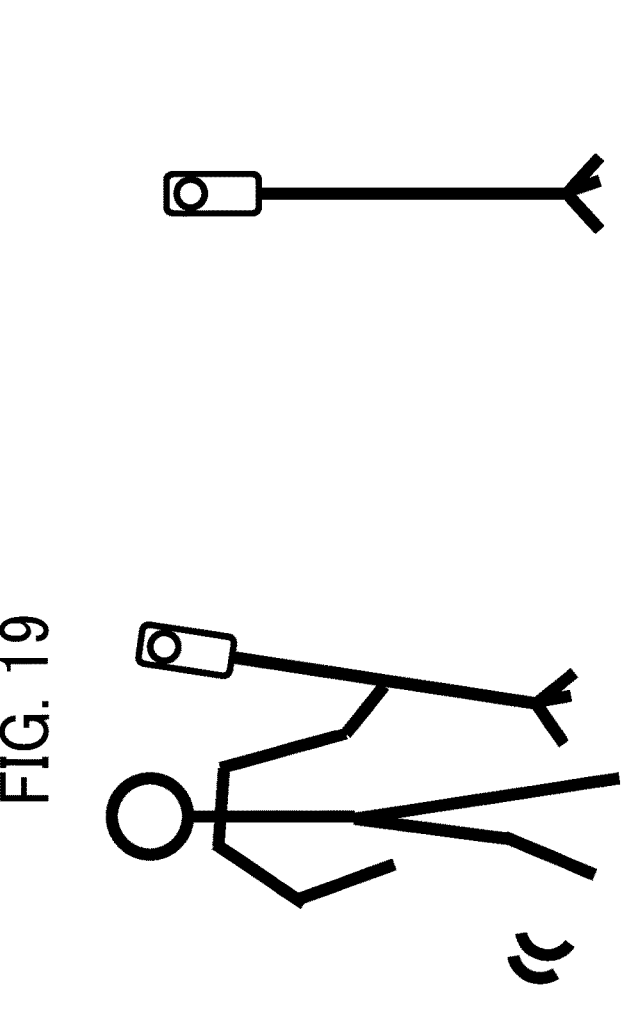
FIG. 19 is an illustration of switch between a moving-image capturing mode and a still-image capturing mode by the image-capturing apparatus.
Figure 20:
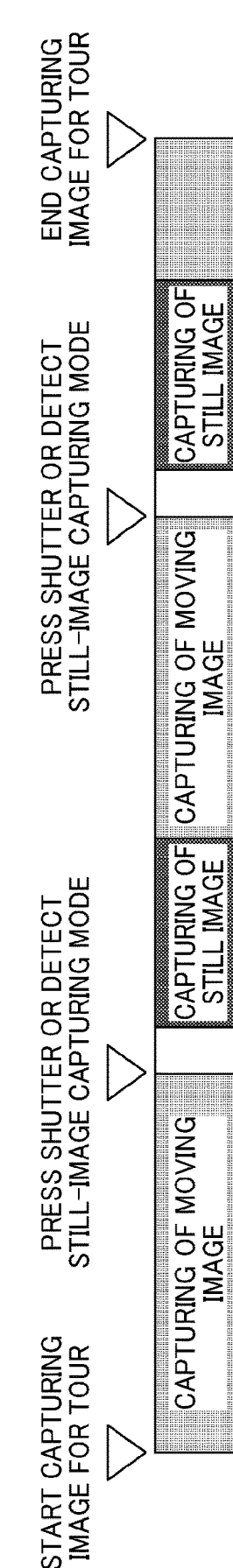
FIG. 20 is an illustration of timings of switching between the moving-image capturing mode and the still-image capturing mode.

The following describes the moving-image capturing mode and the still-image capturing mode, with reference to FIGS. 19 and 20. FIG. 19 is an illustration of switch between the moving-image capturing mode and the still-image capturing mode by the image-capturing apparatus. As described above, the image-capturing apparatus 10 has two image-capturing modes: the moving-image capturing mode and the still-image capturing mode. The moving-image capturing mode is intended for position estimation, whereas the still-image capturing mode is intended to obtain images to be viewed. Further, the moving-image capturing mode is used during the moving state, whereas the still-image capturing mode is used during the stationary state.

The moving-image capturing mode and the still-image capturing mode differ in image-capturing specifications according to the intended use. The moving-image capturing mode involves acquiring continuous captured images (continuous frames) at low resolutions and gray scale without a need for high resolution and color layers to estimate a position. The still-image capturing mode involves high resolutions, color information (red, green, and blue (RGB)), and high dynamic ranges without a need for acquiring continuous frames. Further, the moving-image capturing mode is used during the moving state, whereas the still-image capturing mode is used during the stationary state.

FIG. 20 is an illustration of timings of switching between the moving-image capturing mode and the still-image capturing mode. In other words, FIG. 20 is a timing chart of switch between the moving-image capturing mode and the still-image capturing mode in the processing in FIG. 16.

The image-capturing apparatus 10, for example, switches between the moving-image capturing mode and the moving-image capturing mode in a time-division manner. As described above, since the moving-image capturing mode is intended to acquire images to be used for estimating a position, continuous frames are to be captured. However, the still-image capturing mode, which is intended to acquire images to be viewed in a virtual tour, eliminates a need for capturing continuous frames but involves capturing one image or an image obtained by a high-dynamic range combine of multiple frame images.

In the still-image capturing mode, the position of the photographer is to be reflected in a captured image, and a still image is to be captured by some explicit action of the photographer. To start the still-image capturing mode, the image-capturing apparatus 10 switches from the moving-image capturing mode to the still-image capturing mode in response to, for example, pressing the shutter button of the operation unit 115 of the image-capturing apparatus 10 by the photographer. In this case, the shutter pressed by the operator (the photographer) may be a shutter button of the main body of the image-capturing apparatus 10, or may be a shutter based on an operation of a remotely operable application or a controller. For example, when a real estate property is photographed, the photographer is not to be reflected in a captured image. To prevent reflection of the photographer in a captured image, when an operation is performed on the shutter button of the main body of the image-capturing apparatus 10, the image-capturing apparatus 10 is to capture and store a still image a predetermined time after pressing the shutter button by the photographer. As a result, the photographer moves out of the image-capturing range after pressing the shutter button so as not to be reflected in a captured image. In addition, when a remote operation is performed, the photographer is to performs an operation from outside the image-capturing range to capture an image.

The image-capturing apparatus 10 may be configured to switch from the moving-image capturing mode to the still-image mode in response to detecting by the movement detection unit 16 that the image-capturing apparatus 10 comes to the stationary state when the image-capturing apparatus 10 fixed to the support 20 is placed at a certain position or the photographer holding the image-capturing apparatus 10 in his/her hand comes to rest. Alternatively, the image-capturing apparatus 10 may be configured to automatically switch from the moving-image capturing mode to the still-image capturing mode when a certain period of time has elapsed since a start of the moving-image capturing mode. Such configurations eliminate a need for a shutter operation by an operator, and enables images for a tour to be captured without a hitch.

In the moving-image capturing mode, the image-capturing apparatus 10 automatically captures a moving image irrespective of the photographer's intention. For example, the image-capturing apparatus 10 automatically switches from the still-image capturing mode to the moving-image capturing mode to start capturing a moving image after capturing a still image. Alternatively, the image-capturing apparatus 10 may switch from the still-image capturing mode to the moving-image capturing mode to start capturing a moving image, in response to detecting a restart of movement of the image-capturing apparats 10 by the movement detection unit 16.

As described above, the image-capturing apparatus 10 switches, on a time-series basis, between the moving-image capturing mode to capture a low-resolution moving image for the position estimation and the still-image capturing mode to capture a high-resolution still image to be viewed in a virtual tour. This configuration enables the effective capturing of images to be used to generate a tour image (a set of images to be viewed in a tour). In the above-described configuration, the image-capturing apparatus 10 starts capturing a moving image (i.e., starts the moving-image capturing mode) at a start of capturing an image for a tour. Alternatively, the image-capturing apparatus 10 may start capturing a still image (i.e., starts the still-image capturing mode) at a start of capturing an image for a tour.

The image-capturing apparatus 10 uploads captured moving images and still images to the image processing apparatus 50 via the communication terminal 90 as needed. The image processing apparatus 50 temporarily stores the moving image and the still image transmitted from the image-capturing apparatus 10 in the storage unit 5000 to generate a tour image. Note that the image-capturing apparatus 10 may be configured to upload a moving image and a still image directly to the image processing apparatus 50 without via the communication terminal 90.

Next, a process of generating a tour image using images captured by the image-capturing apparatus 10 is described with reference to FIGS. 21 (21A and 21B) to 29 (29A and 29B).

Figures 21A, 21B:
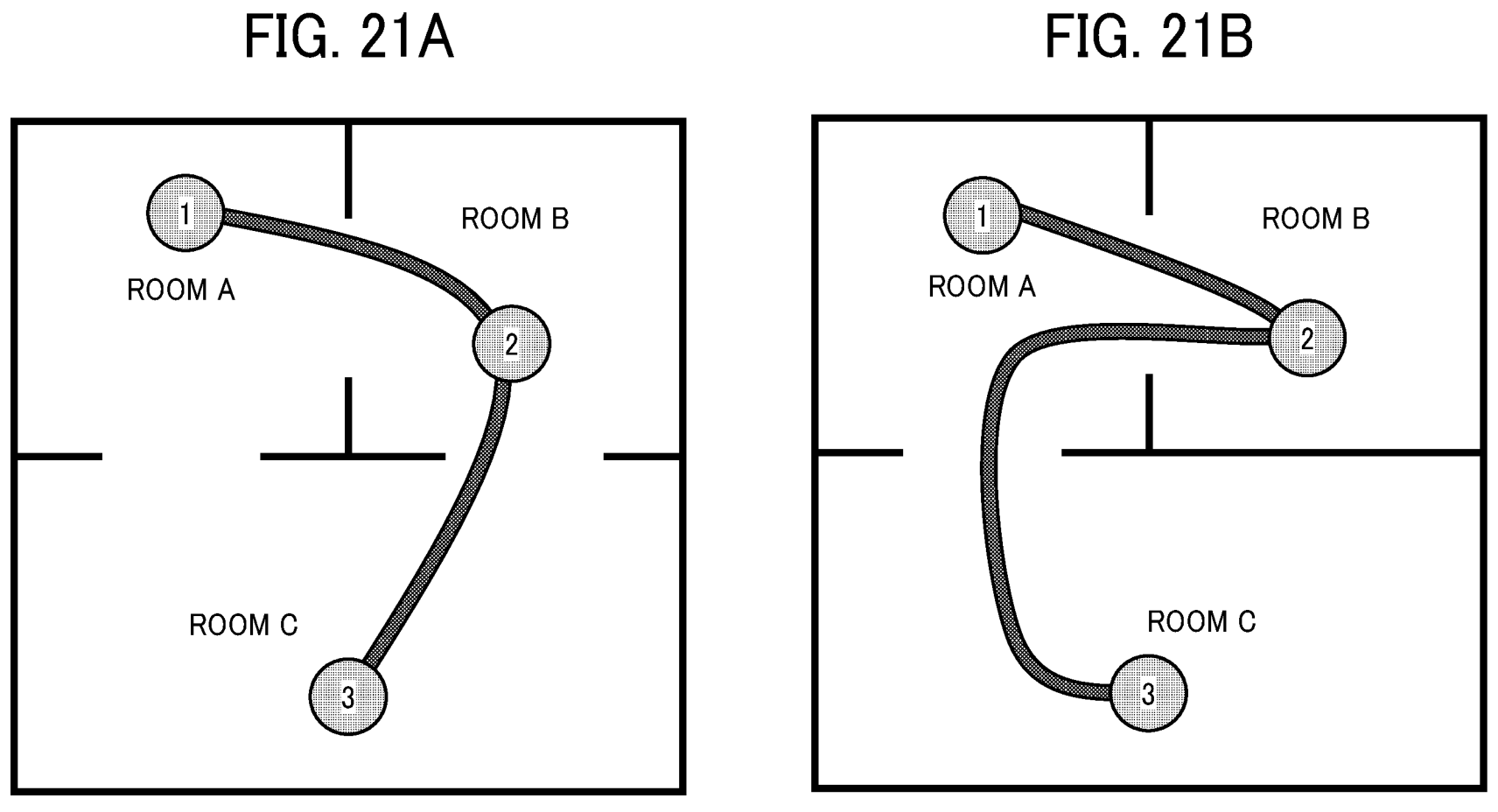

FIGS. 21A and 21B are illustrations of tour paths in a virtual tour, according to embodiments of the present disclosure. The tour path is generated in accordance with the adjacency of rooms (i.e., spaces) inside the real estate property. For example, if a room A and a room B are adjacent to each other with a doorway therebetween that allows the photographer to enter or leave the rooms A and B, the captured still images of the room A and the room B are to be linked together by a path. However, if no doorway is between the room A and the room C adjacent to each other so that the photographer is unable to enter or leave the rooms A and C, the captured still images of the room A and the room C are not to be linked together by a path. This configuration involves automatically determining which captured images are to be linked together by a path, using the image-capturing positions at which the still images have been captured and the route therebetween, so as to automatically generate a virtual tour.

As illustrated in FIGS. 21A and 21B, the tour paths each are generated to link captured still images together in the order at which the still images have been captured. FIG. 21A, for example, indicates the path linking the room A, the room B, and the room C together in the image-capturing order: the room A, the room B, and the room C. The path in FIG. 21B, however, reaches the room C after returning to the room A from the room B in the real space because the room B and the room C are not physically connected to each other despite their continuous shooting. In such a case, if paths are simply connected in the order of shooting, rooms that cannot be visited originally are connected by the paths, resulting in a tour that is different from reality. In view of such a situation, the path linking the room B and the room C in FIG. 21B is generated to have a route passing through the room A again in consideration of the structure of the real space.

To achieve such a path, the image processing apparatus 50 generates a path based on an algorithm that determines at which room each image-capturing point (position) on the moving path during the image capturing is located to generate a path properly linking the captured images in a tour image. The following describes such an algorithm for automatically generating a path, which is performed by the image processing apparatus 50.

Figure 22:
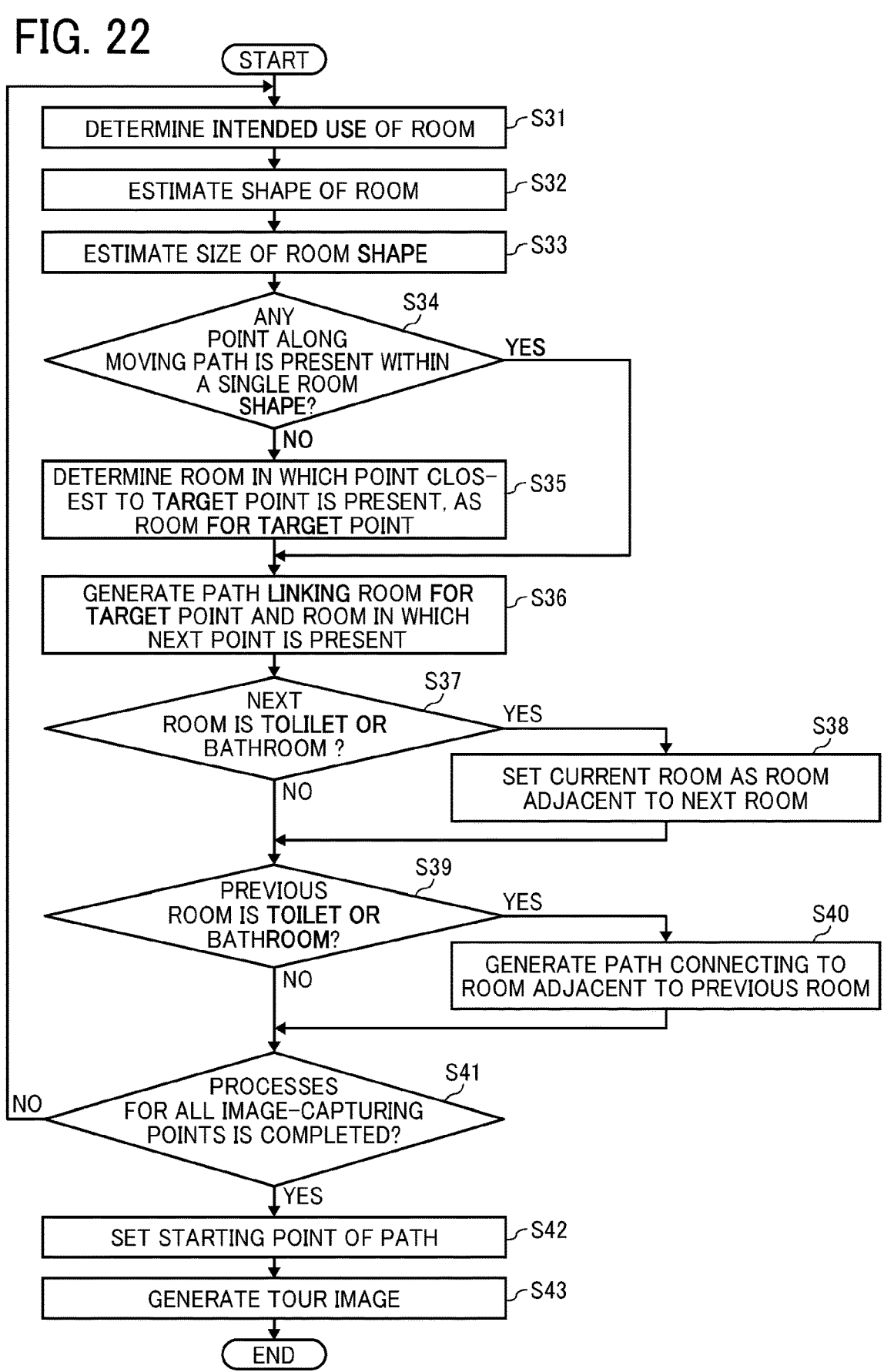
FIG. 22 is a flowchart of processes for generating a tour image, which is performed by the image processing apparatus in FIG. 1.

FIG. 22 is a flowchart of processes for generating a tour image, which is performed by the image processing apparatus 50. The image processing apparatus 50 performs the processing for generating a tour image using a moving image and a still image captured by the image-capturing apparatus 10. In the following description, it is assumed that the image processing apparatus 50 acquires a moving image and a still image captured by the image-capturing apparatus 10 in advance. At this time, the transmission/reception unit 51 of the image processing apparatus 50 receives (acquires) the moving image and the still image transmitted from the image-capturing apparatus 10. In FIGS. 23 to 27, the still images are assumed to be obtained by capturing images of the room A, the room B, and the room C at the image-capturing positions 1, 2, and 3 within the room A, the room B, and the room C, respectively.

First, the use-determination unit 54 of the image processing apparatus 50 determines the intended use of a room reflected in a captured (acquired) moving image (step S31). Specifically, the use-determination unit 54 determines the use (category) of the room reflected in the moving image using parameters such as typical machine learning or a feature amount of the moving image. The intended use of a room to be determined is, for example, a bathroom (a toilet or a bath), or an entrance.

Next, the shape-estimation unit 55 estimates the shape of the room reflected in the acquired moving image (step S32). Specifically, the shape-estimation unit 55 estimates the shape of a room reflected in or appearing in a captured moving image, for example, by estimating a structure of the room based on its boundary such as the floor, the wall, and the ceiling, which is obtained by detecting a straight line of an object reflected or appearing in a moving image and obtaining a vanishing point of the detected straight line. Alternatively, the shape-estimation unit 55 estimates the shape of such a room using three-dimensional information acquired from the image-capturing apparatus 10 or using a typical machine learning. Using the estimated shape of the room, the shape-estimation unit 55 restores its three-dimensional shape and obtains a room shape as viewed from above.

Figure 23B:
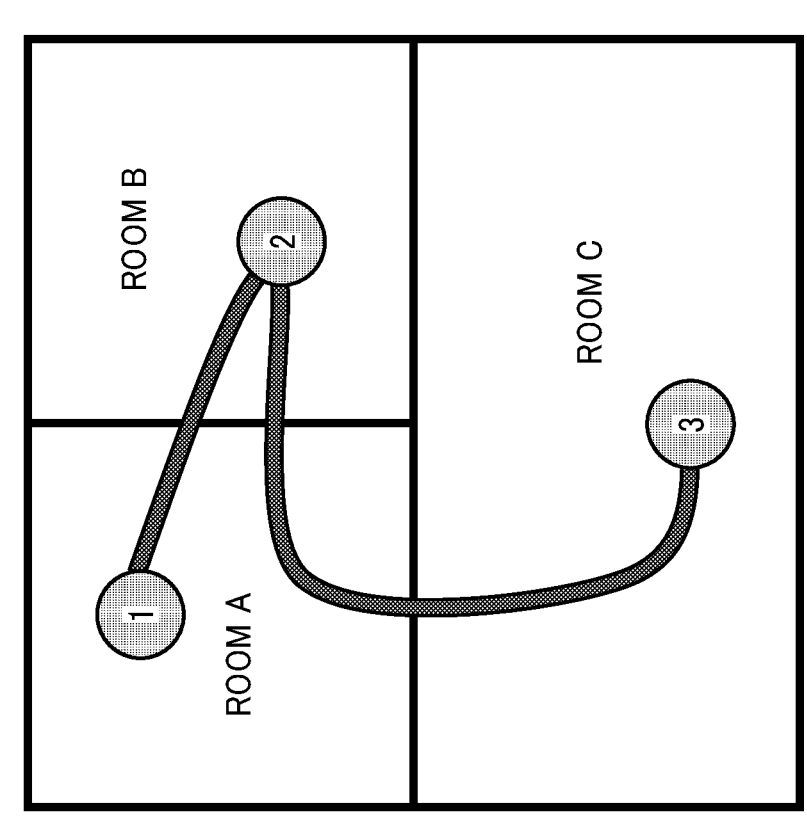
FIGS. 23A and 23B are illustrations of a process for estimating the size of each room shape, according to an embodiment.
Figure 23A:
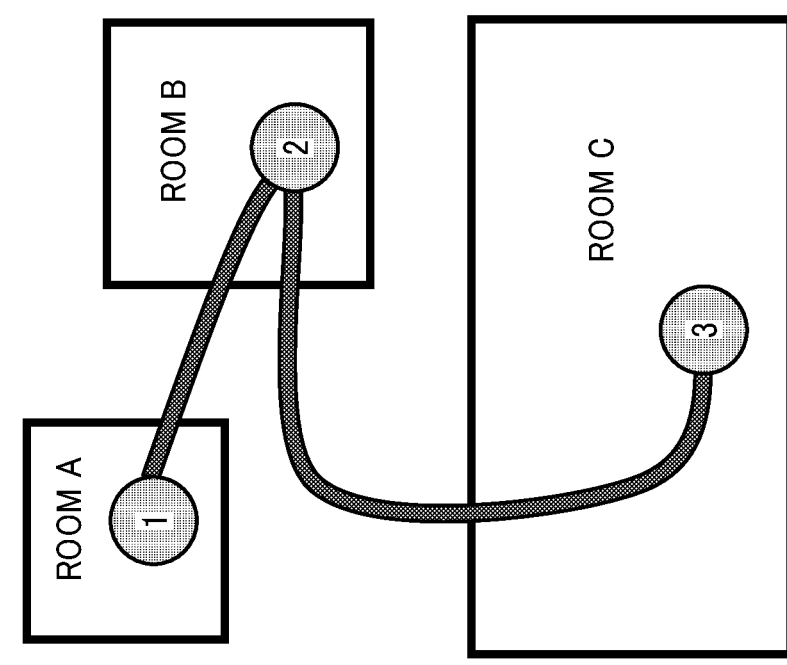

Further, the shape-estimation unit 55 estimates the size of a room shape whose structure has been estimated in the step S32 (step S33). Specifically, the shape-estimation unit 55 adjusts the size of the estimated room shape in accordance with the coordinate system of each point of the moving image on the movement path. As illustrated in FIG. 23A, the shape of the room estimated in step S32 is difficult to determine its absolute size when restored from a single image. As illustrated in FIG. 23B, the shape-estimation unit 55 determines the size of each room shape based on the coordinate system of each point of the moving image on the moving path during capturing of the moving image, so as to arrange each room shape of a correct size on the moving path during the capturing of the moving image. The shape-estimation unit 55 estimates the size of each room shape using the image-capturing height at the time of capturing a moving image and an average value of sizes that provide a gap of zero between adjacent room shapes. As described above, the shape-estimation unit 55 estimates the shape and size of a room appearing in the moving image. Further, the position-estimation unit 56 estimates relative image-capturing positions between a moving image and multiple still images captured in a time-division manner.

Figures 24A, 24B:
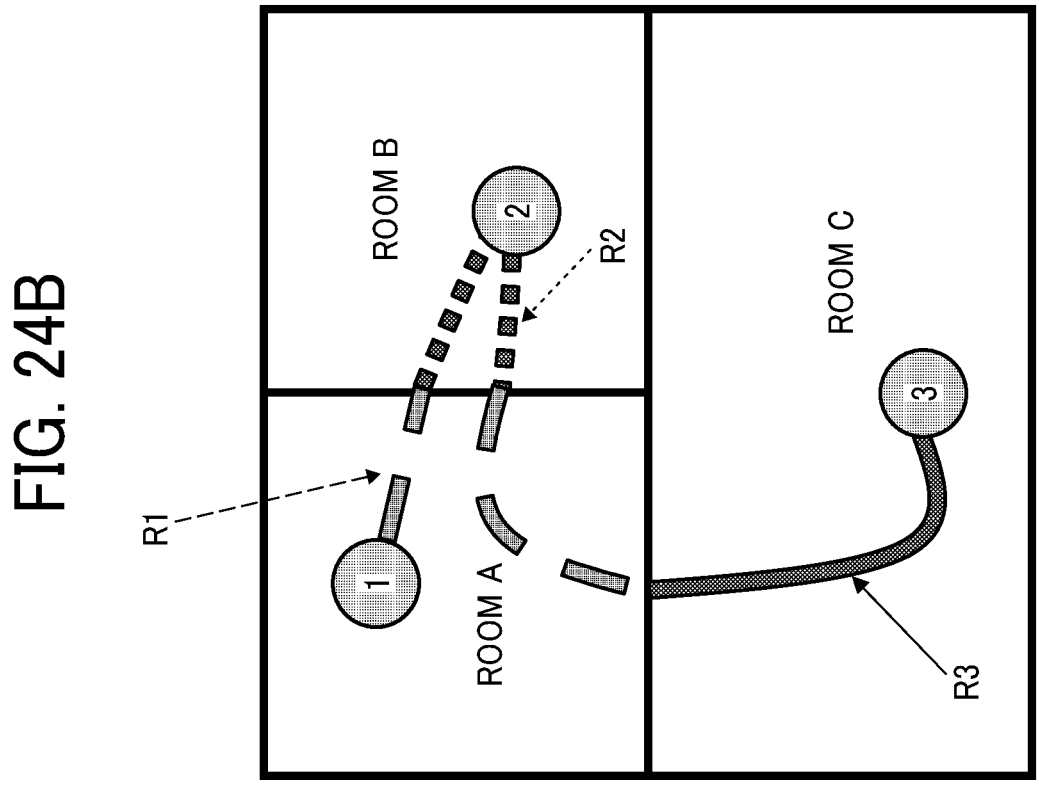
FIGS. 24A and 24B are illustrations of a process for determining a room in which a point on a movement path belongs to, according to an embodiment.
Figure 25B:
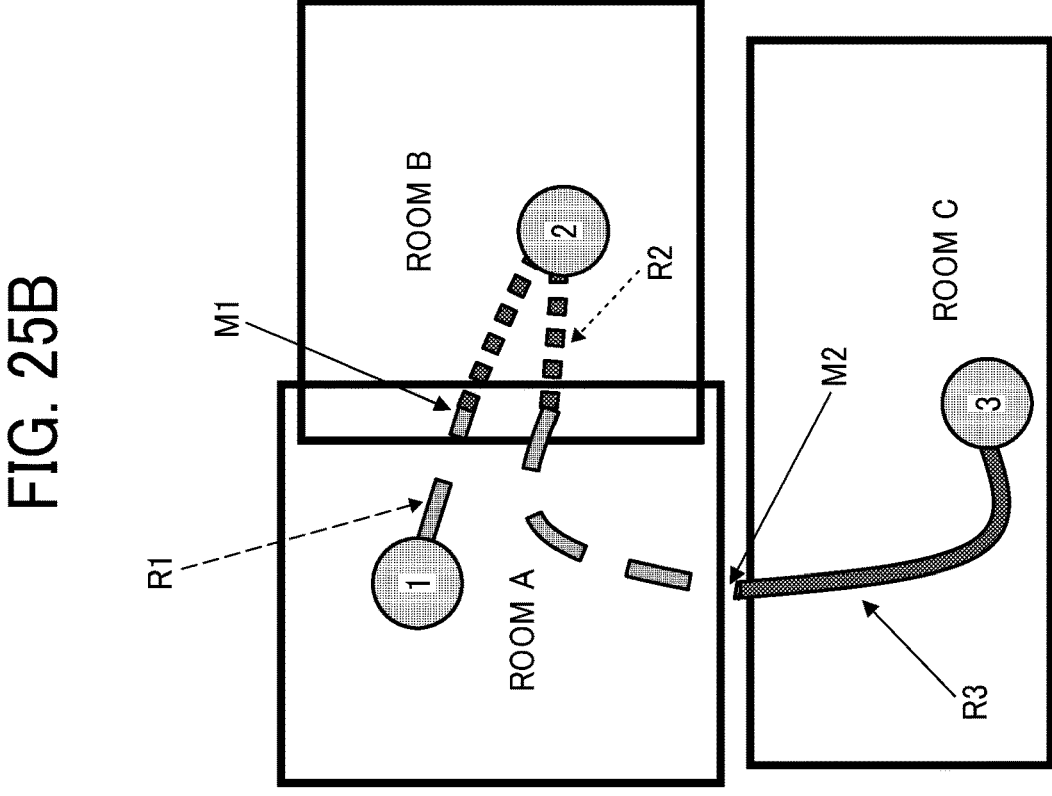
FIGS. 25A and 25B are illustrations of a process for determining a room in which a point on a movement path belongs to, according to another embodiment.
Figure 25A:
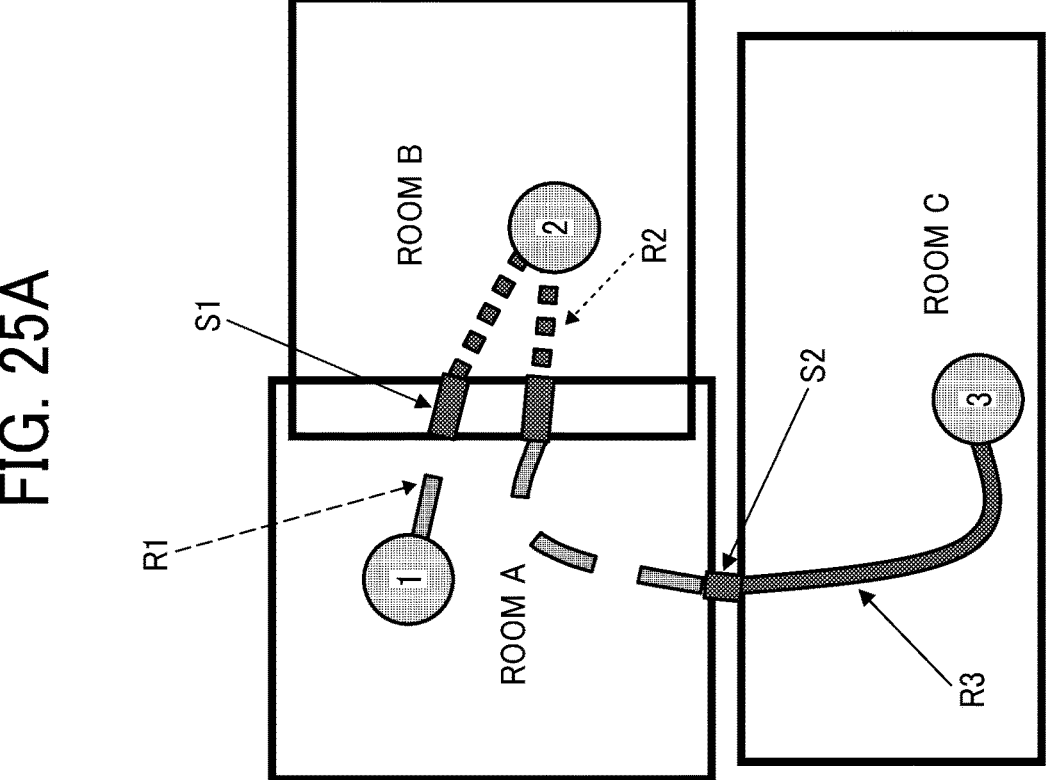

Next, the detection unit 57 determines in which room shape among the room shapes estimated in the step S32 and the step S33 each point of the moving image is located (step S34). In other words, the detection unit 57 detects a shape to which a point on a movement path of the moving image belongs to, from the estimated shapes. The detection unit 57 detects, from the coordinate values, in which room each point on the movement path is located among the room shapes arranged in the step S33. Thus, the detection unit 57 detects in which room each point on the movement path is located. For example, as illustrated in FIG. 24B, the image processing apparatus 50 uniquely determines in which room each point is located based on the coordinate values on the movement path during capturing of the restored moving image. In FIG. 24B, the image processing apparatus 50 determines that a point on a route R1 is located in the room A, a point on a route R2 is located in the room B, and a point on a route R3 is located in the room C.

In response to detecting by the detection unit 57 that a point of a moving image on the movement path is not present in a single room shape (NO in step S34), the image processing apparatus 50 proceeds to step S35. In a section S1 in FIG. 25A, a point on a movement path does not belong to any single room (i.e., a point on a movement path is located in multiple room shapes (the room A and the room B in FIG. 25A). In such a case, the image processing apparatus 50 fails to uniquely determine which room the point is located in during capturing of an image. In a section S2 in FIG. 25A, a point on the movement path is not located in any room shape. In such a case as well, the image processing apparatus 50 fails to uniquely determine which room the point is located in during capturing of an image. This occurs due to an error in the restoration of the movement path, an error in the estimation of the room shape, and an error in the size of the room shape.

In view of such circumstances, when a target point of a moving image on the movement path is not located in any single room shape, the detection unit 57 determines, as a room for the target point, a room in which a point closest to the target point on the movement path are located (step S35), so as to uniquely determine a room in which a target point is located. In other words, in response to detecting that the target point belongs to two or more of the estimated room shapes, the path-generation unit 58 generates a path to allow the target point to belong to a room shape closest to the target point. The detection unit 57 calculates a point closest to a target point on the movement path within the sections S1 and S2, and determines, as a room for the target point, a room in which a point closest to the target point on the movement path are located, as in each of sections M1 and M2 in FIG. 25B.

In step S34, in response to detecting by the detection unit 57 that each point of the moving image on the movement path is present in a single room shape (YES in step S34), the image processing apparatus 50 proceeds to step S36.

Figure 26:
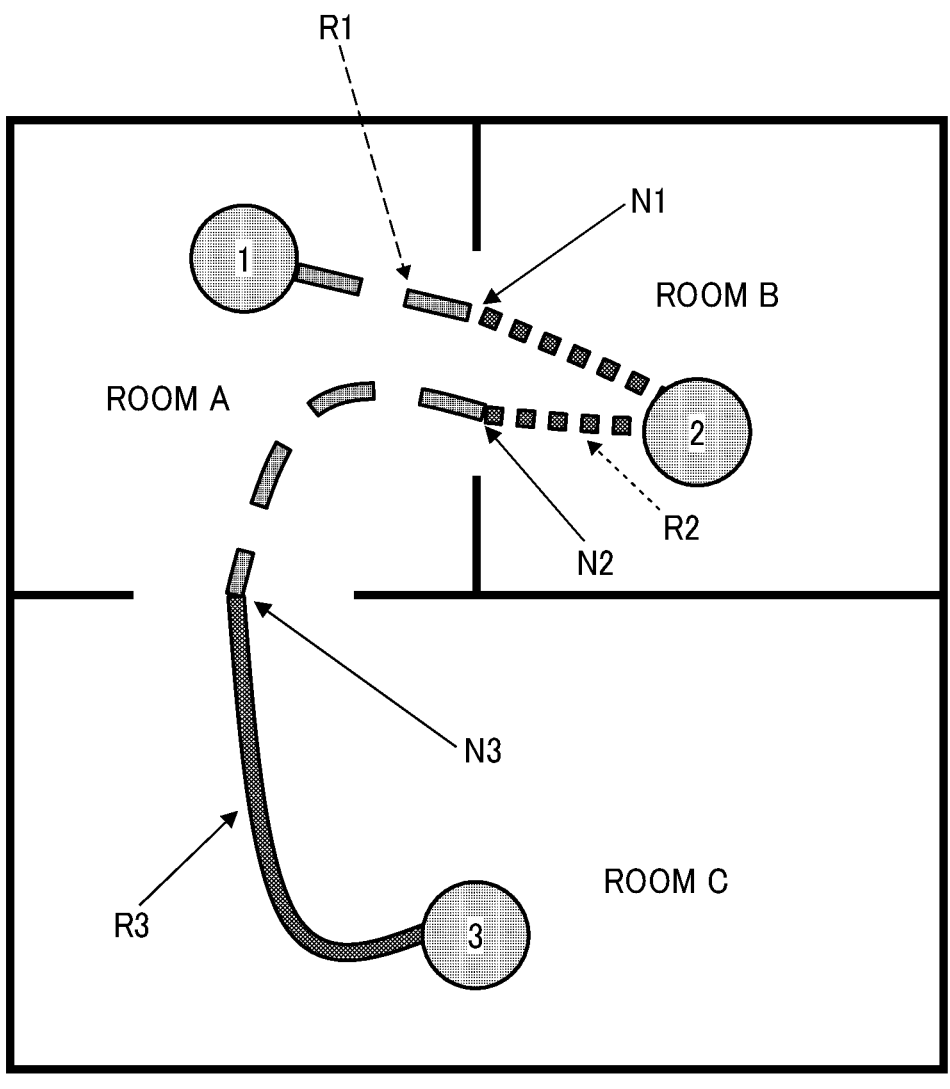
FIG. 26 is an illustration of a path generated by a path-generation unit, according to an embodiment.

Next, the path-generation unit 58 generates a path linking a room in which a point of the moving image on the movement path is present and a room in which the next point is present (step S36). After uniquely determining a room shape for each point on the movement paths in steps S34 and S35, the path-generation unit 58 generates a path linking a room in which a first point is present and another room in which a second point following the first point is present, for the points on the movement paths. In FIG. 26, the path-generation unit 58 generates a path N1 linking the room A and the room B into which the photographer has entered after the room A. In addition, even for a movement from the room B back to the room A and then to the room C, the path-generation unit 58 properly generates a path linking the room A and the room B based on the estimation results of steps S32 and S33 because the sections N2 and N3 of the room A exist between the image-capturing position 2 and the image-capturing position 3. As a result, the path-generating unit 58 generates paths (a resultant path) bidirectionally taking routes R1, R2, and R2 as illustrated in FIG. 26. In other words, the path-generating unit 58 generates a path between the room A and the room B and a path between the room A and the room C. The path-generating unit 58 generates paths linking the rooms together to associate still images with each other whose image-capturing positions are closest to each other among multiple captured still images of each room.

Next, in response to determining by the determination unit 53 that the intended use of a next room determined in step S31 is a toilet or a bathroom (YES in step S37), the image processing apparatus 50 proceeds to step S38. In response to determining by the determination unit 53 that the intended use of the next room determined in step S31 is not a toilet or a bathroom (NO in step S37), the image processing apparatus 50 proceeds to step S39.

Figures 27A, 27B:
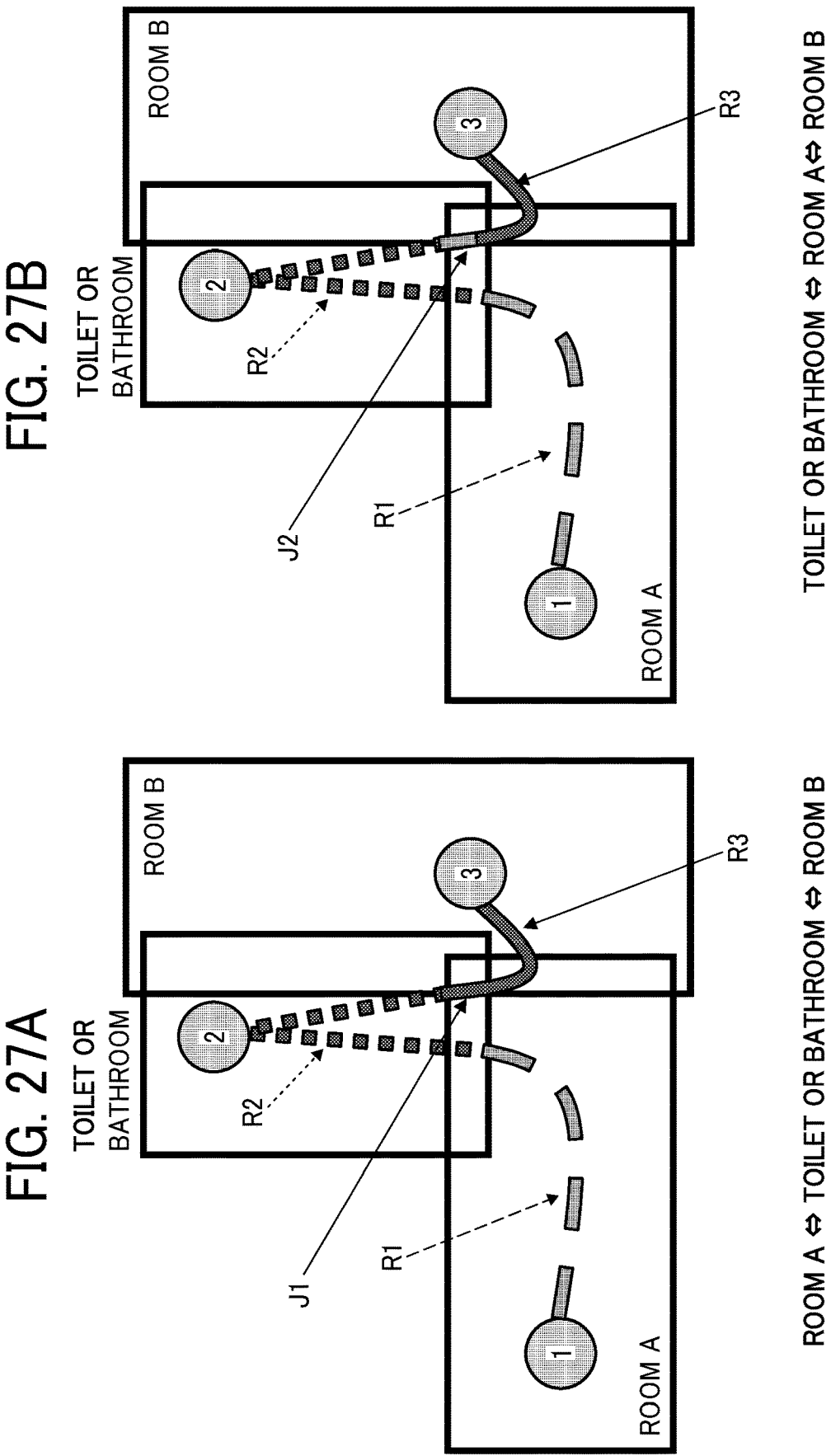
FIGS. 27A and 27B are illustrations of a path generated in a case where the intended use of a room is a toilet or a bathroom, according to an embodiment.

Since most houses have only one room leading to the toilet or bathroom, i.e., one room to return from the toilet or bathroom, erroneous linking of rooms by a path can be prevented. As illustrated in FIG. 27A, for example, in which overlapping regions exists due to due to an error in the above-described processes, a path linking the room A and a room B via a toilet or a bathroom may be generated. In FIG. 27A, the detection unit 57 determines the room for the target point in the overlapping section J1 as the room B based on a point on the movement path closest to the target point, and then the path-generation unit 58 generates a path linking the toilet or bathroom and the room B. However, there are few cases in which a toilet or a bathroom communicates with two different rooms in a real house.

In response to detecting that the next room is a toilet or bathroom (YES in step S37), the determination unit 53 sets the current room as a room adjacent to the next room (step S38). For example, the determination unit 53 stores a room in which a certain point is present, as a room adjacent to the toilet or bath room when the intended use of a room in which a point next to the certain point on the movement path is located is a toilet or a bathroom.

Next, in response to determining by the determination unit 53 that the intended use of the previous room determined in step S31 is a toilet or bathroom (YES in step S39), the image processing apparatus 50 proceeds to step S40. In response to determining by the determination unit 53 that the intended use of the previous room determined in step S31 is not a toilet or a bathroom (NO in step S39), the image processing apparatus 50 proceeds to step S41. When the room for a point immediately before a certain point on the movement path is a toilet or a bathroom, the photographer at the certain point has left the toilet or bathroom. For example, a point in the section J1 of FIG. 27A indicates a point at which the photographer has left the toilet or a bathroom.

In response to determining that the intended use of the previous room determined in step S31 is a toilet or a bathroom (YES in step S39), the path-generation unit 58 generates a path linking the previous room and a room adjacent to the previous room. The path-generation unit 58 generates a path linking a room in which a certain point on the movement path is present and the room adjacent to the next room set in step S38 when a room in which a point immediately before the certain point is present is a toilet or bathroom. Thus, the room immediately after leaving the toilet or the bathroom can be the same as the room immediately before entering the toilet or the bathroom set in the step S38. As illustrated in FIG. 27B, since the room immediately before entering the toilet or the bathroom is set as the room A in the step S38, the path-generation unit 58 generates a path (section J2) linking from the toilet or bathroom to the room A immediately before the toilet or bathroom as a point immediately after leaving the toilet or bathroom, instead of the closest room B. This configuration allows a forced return from the toilet or bathroom back to the previous room, and thus prevents generation of an erroneous path as in FIG. 27A.

Next, in response to determining that all the processes for the moving image captured by the image-capturing apparatus 10 are completed (YES in step S41), the image processing apparatus 50 proceeds to step S42. In response to determining that all the processes for the moving image captured by the image-capturing apparatus 10 are not completed yet (NO in step S41), the image processing apparatus 50 returns to step S31 and repeats the processes following step S31 until all the processes for the moving image captured by the image-capturing apparatus 10 are completed.

Next, the path-generation unit 58 sets a start point of the generated path based on the intended use of the room determined in step S31 (step S42). For example, the path-generation unit 58 sets a position corresponding to a room whose intended use is determined as an entrance, as the start point of the path.

Figure 28:
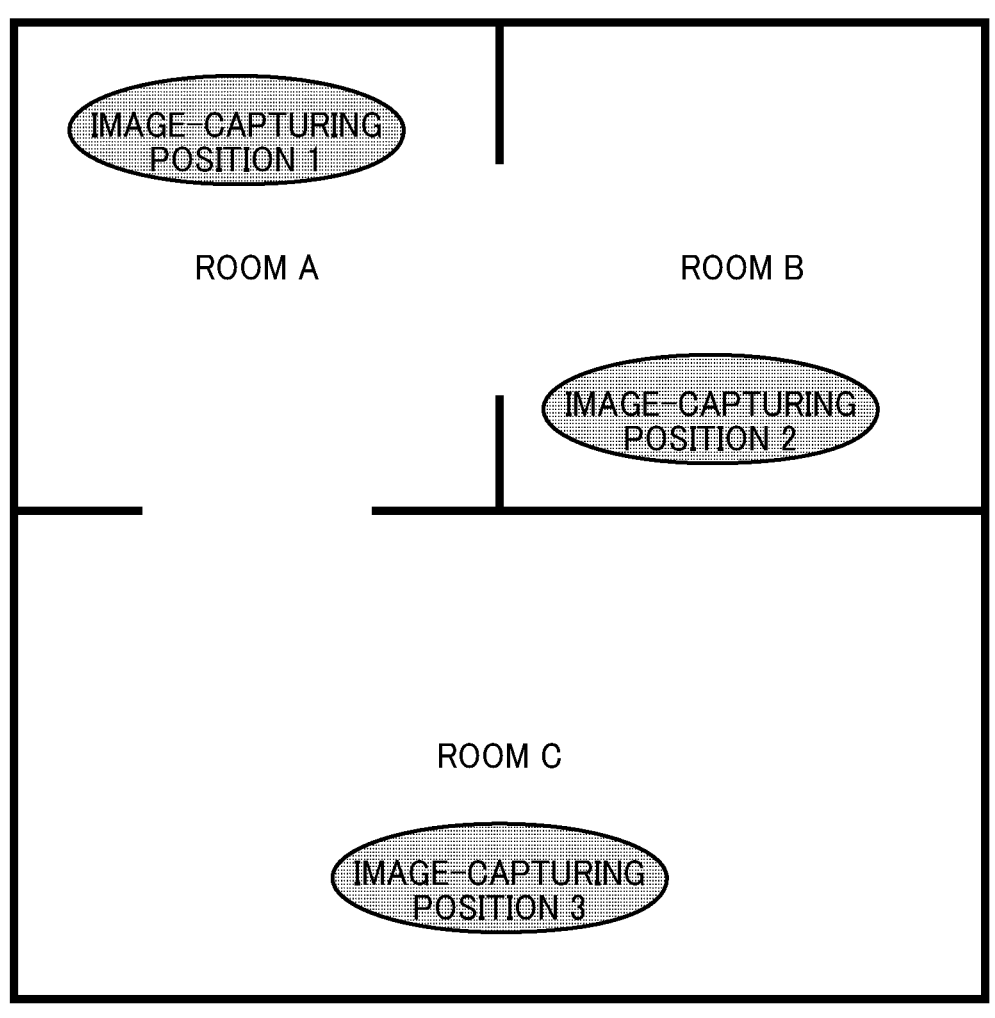
FIG. 28 is an illustration for describing a tour image generated by the image processing apparatus in FIG. 1, according to an embodiment.
Figures 29A, 29B:
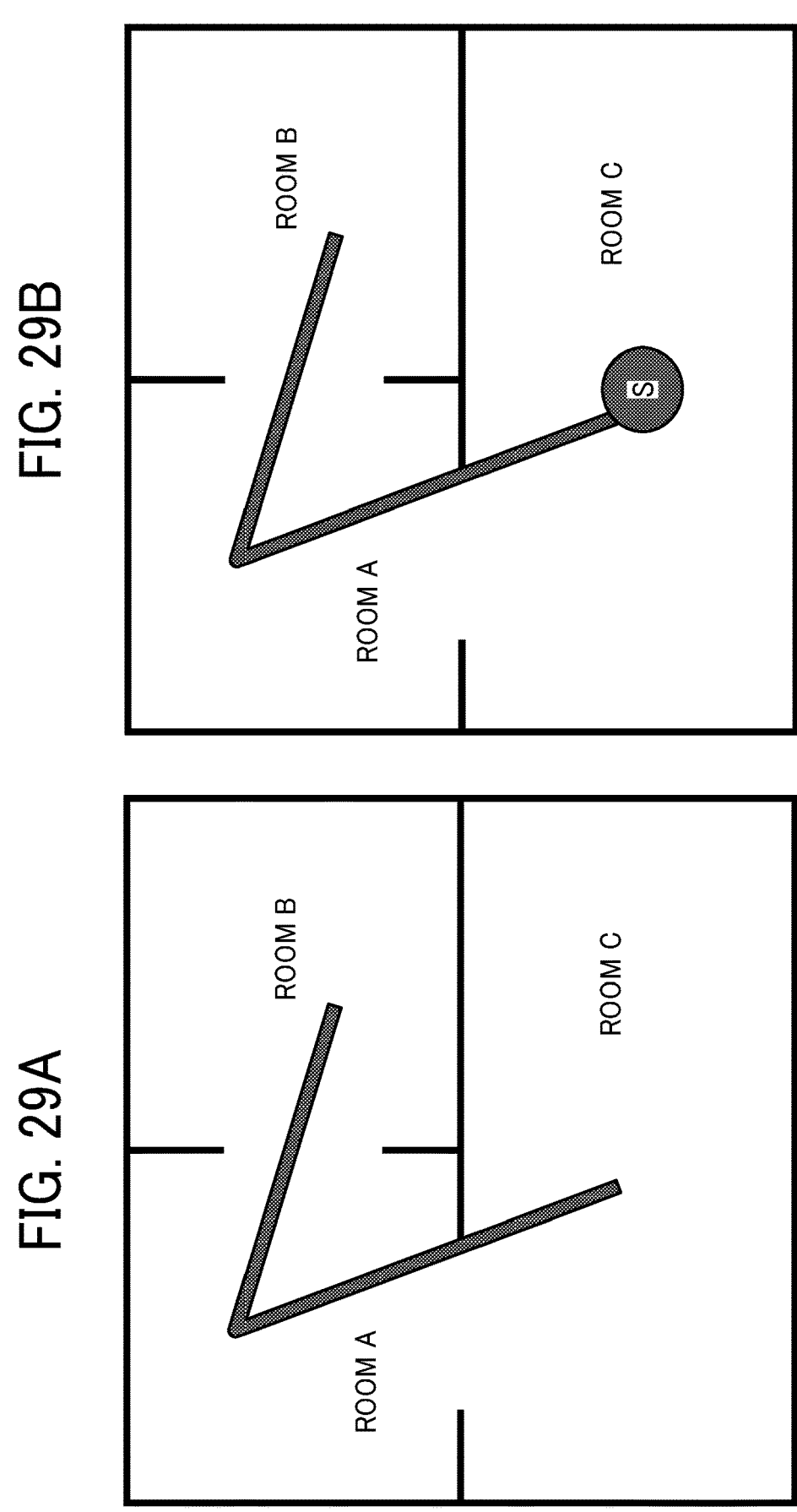
FIGS. 29A and 29B are illustrations for describing a tour image generated by the image processing apparatus in FIG. 1, according to another embodiment.

Then, the image processor 60 generates a tour image, which is a processed image including multiple still images captured by the image-capturing apparatus 10, based on the processing result described above (step S42). Specifically, as illustrated in FIG. 28, the image processor 60 generates a tour image in which multiple still images are associated with each other by associating the image-capturing positions estimated by the position-estimation unit 56 with the shapes estimated by the shape-estimation unit 55. As illustrated in FIG. 29A, in addition to the configuration in FIG. 28, the image processor 60 superimposes the path generated by the path-generation unit 58 on multiple still images associated with each other based on the relative image-capturing positions. Further, as illustrated in FIG. 29B, the image processor 60 indicates the start point (S) of the path set in the step S42 on the tour image.

As described above, the image processing apparatus 50 estimates the image-capturing positions of the high-resolution still images based on the moving path in the moving image captured by the image-capturing apparatus 10. In addition, the image processing apparatus 50 generates a path indicating the order in which images have been captured based on the estimated image-capturing position, the shape of the room reflected in the captured image, and the movement path of the image-capturing apparatus 10.

The tour image generated by the image processing apparatus 50 can be viewed by a viewer using the communication terminal 90. When the generation of the tour image is completed, the image processing apparatus 50 notifies the completion of the generation of the tour image to the communication terminal 90 that is the request source of the tour image capturing. The display control unit 93 of the communication terminal 90 displays the tour image provided from the image processing apparatus 50 on the display 906. Using the communication terminal 90, the viewer can view a virtual tour of a real estate property with a tour image provided from the image processing apparatus 50.

As described above, the image processing system 1 improves the accuracy of estimation of the image-capturing positions of the captured images by accurately associating high-resolution still images used to create a virtual tour with the image-capturing positions of multiple still images, which are estimated using a moving image captured by the image-capturing apparatus 10. The image processing system 1 automatically creates a virtual tour (high-quality virtual tour) having an appropriate path (route).

In addition, the image processing system 1 efficiently acquires a captured image for creating a virtual tour by switching between the high-resolution still-image capturing mode to acquire an image to be viewed and the low-resolution moving-image capturing mode for the position estimation in a time-division manner by using the image-capturing apparatus 10.

Further, the image processing system 1 captures an image (a spherical image) of an omnidirectional view of the inside of a real estate property as a certain site, using a spherical-image capturing apparatus, and uses natural-looking images without errors due to disparity generated during the capturing of images, so as to provide a high-quality virtual tour that allows the viewer to experience a virtual tour that is close to real. The image processing system 1 further provides a virtual tour with higher accuracy of the position estimation irrespective of a case where the image-capturing apparatus 10 is fixed to the support 20 such as a unipod to prevent the photographer from appearing in a captured image.

As described above, the image processing method according to an embodiment of the present invention is an image processing method executed by the image processing apparatus 50 that performs processing on captured images obtained by capturing images of a predetermined site in all directions, and executes a still image acquisition step of acquiring a plurality of still images captured at different capturing positions in the site, a moving image acquisition step of acquiring moving images captured while moving from a first point to a second point in the site, a position estimation step of estimating relative capturing positions of the plurality of still images based on the acquired moving images, and an image processing step of generating a processed image (for example, a tour image) including the plurality of still images associated with each other based on the estimated capturing positions. This configuration of the image processing method provides a virtual tour with a higher accuracy of estimation of the image-capturing positions of captured images.

The position estimation step estimates relative shooting positions of the plurality of still images based on the shape estimated by the shape estimation step, and the image processing step generates a processed image (for example, a tour image) including the paths corresponding to the plurality of still images. This configuration of the image processing method enables an accurate association between multiple still images and the image-capturing position of the multiple still images, based on the image-capturing positions of the still images estimated using the captured moving image, the shape of a space reflected in the captured images, and generated paths. The image processing system 1 automatically creates a virtual tour (high-quality virtual tour) with higher accuracy of the position estimation and an appropriate path (route).

In the image processing method according to an embodiment of the present invention, the moving image has lower resolution than that of the still image. In the image processing method, the still image and the moving image are captured by the spherical-image capturing apparatus. The image processing method enables automatic creation of a virtual tour (high-quality virtual tour) with an appropriate path (route).

Furthermore, the image processing system according to an embodiment of the present invention is the image processing system 1 including the image processing apparatus 50 and the image-capturing apparatus 10. The image-capturing apparatus 10 captures a still image and a moving image by switching between the still-image capturing mode and the moving-image capturing mode in a time-division manner. Further, the image-capturing apparatus 10 switches the still-image capturing mode and the moving-image capturing mode according to its movement state in the site. This configuration enables the image processing system 1 to efficiently acquire a captured image for creating a virtual tour.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Although an image processing method, a program, an image processing apparatus, and an image processing system according to an embodiment of the present invention have been described above, the present invention is not limited to the above-described embodiment, and can be modified within a range that can be conceived by those skilled in the art, such as addition, modification, or deletion of another embodiment, and any mode is included in the scope of the present invention as long as the operation and effect of the present invention are achieved.

The functional units as described above is achieved by a computer-executable program written by legacy programming language or object-oriented programming language such as assembler language, C language, C++ language, C #language, and Java (registered trademark), and the program can be distributed via telecommunication line or upon being written on a computer-computer-readable recording medium such as ROM, electrically erasable and programmable read only memory (EEPROM), erasable programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Numerous additional modifications and variations are possible in light of the above teachings. It is therefore to be understood that, within the scope of the appended claims, the disclosure of this patent specification may be practiced otherwise than as specifically described herein. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

REFERENCE SIGNS LIST

1 Image processing system
10 Image-capturing apparatus
11 Transmission/reception unit
12 Operation receiving unit
13 Image-capturing control unit (example of image-capturing control means)
14 Moving-image capturing unit
15 Still-image capturing unit
16 Movement detection unit
20 Support
50 Image processing apparatus
51 Transmission/reception unit (an example of still-image acquisition means, an example of moving-image acquisition means)
54 Use-determination unit
55 Shape-estimation unit
56 Position-estimation unit (example of position estimation means
57 Detection unit
58 Path-generation unit (example of path generation means)
60 Image processor (example of image processing means)
90 Communication terminal
91 Transmission/reception unit
92 Receiving unit
93 Display control unit (example of display control means)

The invention claimed is:
1. An image processing method, comprising:
acquiring multiple still images of omnidirectional views captured at different image-capturing positions in corresponding spaces in a site, wherein each image-capturing position is captured within a different space of the spaces in the site;
acquiring a moving image during movement from a first location to a second location in the site such that the moving image is acquired at least from the first location and the second location;
estimating the image-capturing positions of the multiple still images of the spaces based on the acquired moving image;
generating a path that associates the image-capturing positions of the multiple still images of the spaces with each other; and
generating, based on the path, a virtual tour image for viewing the spaces inside the structure, the virtual tour image including the multiple still images associated with each other.

2. The image processing method according to claim 1, further comprising:
estimating shapes of the spaces in the site reflected in the moving image, wherein
the estimating of the image-capturing positions is performed based on the acquired moving image and the estimated shape, and
the generating of the path is performed based on the estimated image-capturing positions and the estimated shapes.
3. The image processing method according to claim 2, further comprising:
detecting, from the estimated shapes, a shape to which a point on the path belongs, wherein
in response to detecting that the point belongs to two or more of the shapes, the generating of the path is performed such that the point belongs to a shape closest to the point.
4. The image processing method according to claim 3, further comprising:
determining an intended use of each of the spaces, wherein
the generating of the path is performed based on the determined intended use.
5. The image processing method according to claim 4, wherein the generating of the path sets a starting point of the path based on the determined intended use.
6. The image processing method according to claim 1, wherein the moving image has a lower resolution than resolution of the multiple still images.
7. The image processing method according to claim 1, wherein the acquiring acquires spherical images.
8. A non-transitory computer readable recording medium storing a computer-readable code for controlling a computer to carry out the image processing method according to claim 1.
9. An image processing apparatus, comprising:
still-image acquisition circuitry configured to acquire multiple still images of omnidirectional views captured at different image-capturing positions in corresponding spaces in a site, wherein each image-capturing position is captured within a different space of the spaces in the site;
moving-image acquisition circuitry configured to acquire a moving image captured during a movement from a first location to a second location in the site;
position estimation circuitry configured to estimate the image-capturing positions of the multiple still images of the spaces based on the acquired moving image; and
image processing circuitry configured to
generate a path that associates the image-capturing positions of the multiple still images of the spaces with each other; and
generate, based on the path, a virtual tour image for viewing the spaces inside the structure, the virtual tour image including the multiple still images associated with each other.
10. An image processing system, comprising:
the image processing apparatus according to claim 9; and
an image-capturing apparatus to capture the moving image and the multiple still image, wherein
the image-capturing apparatus includes image-capturing control circuitry configured to switch between a still-image capturing mode to capture the still images and a moving-image capturing mode to capture the moving image in a time-division manner.

11. The image processing system according to claim 10, wherein the image-capturing control circuitry switches between the multiple still-image capturing mode and the moving-image capturing mode according to a movement state of the image-capturing apparatus in the site.

12. The image processing system according to claim 10, further comprising:

a communication terminal communicable with the image processing apparatus, the communication terminal including display control circuitry configured to display the processed image generated by the image processing apparatus.

13. The image processing system according to claim 12, wherein the display control circuitry displays the virtual tour image in which the path associating the multiple still image with each other are superimposed on the multiple still images.

\* \* \* \* \*